(12) United States Patent  (10) Patent No.: US 9,172,275 B2
Bhakta  (45) Date of Patent: Oct. 27, 2015

(54) POWER MONITORING AND CONTROL SYSTEM AND METHOD

(76) Inventor: Minesh Bhakta, Tempe, AZ (US)

( * ) Notice: Subject to any disclaimer, the term of this patent is extended or adjusted under 35 U.S.C. 154(b) by 740 days.

(21) Appl. No.: 13/345,699

(22) Filed: Jan. 7, 2012

(65) Prior Publication Data

US 2012/0109398 A1    May 3, 2012

Related U.S. Application Data

(63) Continuation-in-part of application No. 11/925,690, filed on Oct. 26, 2007, now Pat. No. 8,095,243.

(51) Int. Cl.
  *G06F 19/00*   (2011.01)
  *H02J 13/00*   (2006.01)
  *H02J 3/14*    (2006.01)

(52) U.S. Cl.
  CPC ............ *H02J 13/0024* (2013.01); *H02J 3/14* (2013.01); *H02J 2003/143* (2013.01); *Y02B 70/3225* (2013.01); *Y02B 70/3266* (2013.01); *Y02B 90/2623* (2013.01); *Y04S 20/222* (2013.01); *Y04S 20/242* (2013.01); *Y04S 40/122* (2013.01)

(58) Field of Classification Search
  USPC ............ 700/286, 292, 297–289, 21, 22, 279; 323/248, 271, 285; 315/149; 455/128; 439/327, 535, 620.21; 361/3
  See application file for complete search history.

(56) References Cited

U.S. PATENT DOCUMENTS

| | | | | |
|---|---|---|---|---|
| 4,567,557 A | * | 1/1986 | Burns | 700/16 |
| 4,644,320 A | * | 2/1987 | Carr et al. | 340/12.37 |
| 5,521,838 A | * | 5/1996 | Rosendahl | 700/295 |
| 5,576,700 A | * | 11/1996 | Davis et al. | 340/3.31 |
| 5,699,051 A | * | 12/1997 | Billig et al. | 340/657 |
| 5,880,677 A | * | 3/1999 | Lestician | 340/3.1 |
| 6,005,476 A | * | 12/1999 | Valiulis | 340/12.32 |
| 6,380,852 B1 | * | 4/2002 | Hartman et al. | 340/521 |
| 6,552,888 B2 | * | 4/2003 | Weinberger | 361/57 |
| 6,700,224 B2 | * | 3/2004 | Biskup et al. | 307/116 |
| 6,917,506 B2 | * | 7/2005 | Chou | 361/191 |
| 7,141,891 B2 | * | 11/2006 | McNally et al. | 307/39 |
| 7,171,461 B2 | * | 1/2007 | Ewing et al. | 709/223 |
| 7,181,191 B2 | * | 2/2007 | Takeda et al. | 455/404.1 |
| 7,274,303 B2 | * | 9/2007 | Dresti et al. | 340/12.3 |
| 7,504,749 B2 | * | 3/2009 | Von Seidel | 307/131 |
| 7,657,763 B2 | * | 2/2010 | Nelson et al. | 713/300 |
| 7,800,252 B2 | * | 9/2010 | DuBose et al. | 307/126 |
| 8,265,676 B2 | * | 9/2012 | Omar | 455/509 |
| 2002/0097546 A1 | * | 7/2002 | Weinberger | 361/103 |
| 2006/0049694 A1 | * | 3/2006 | Kates | 307/132 E |

* cited by examiner

*Primary Examiner* — Kidest Bahta
(74) *Attorney, Agent, or Firm* — Greg Martinez

(57) ABSTRACT

A system includes a first controller carried by a first electrical outlet, and a management system in communication with the first controller through a first communication link. A second controller is carried by a second electrical outlet, and an electrical load operates in response to receiving power from the second electrical outlet. The management system determines a performance parameter of the electrical load in response to receiving information corresponding to the operation of the electrical load from the first controller.

20 Claims, 23 Drawing Sheets

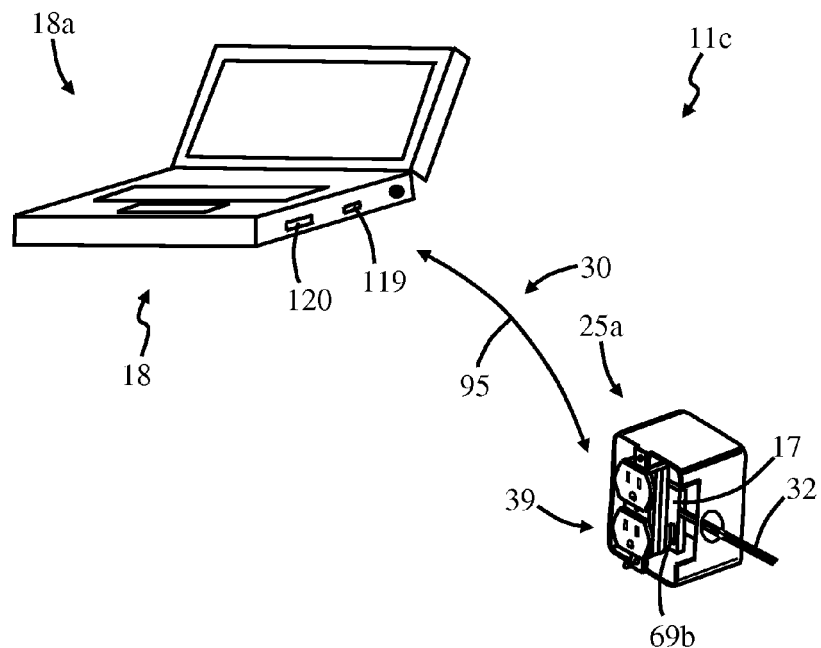
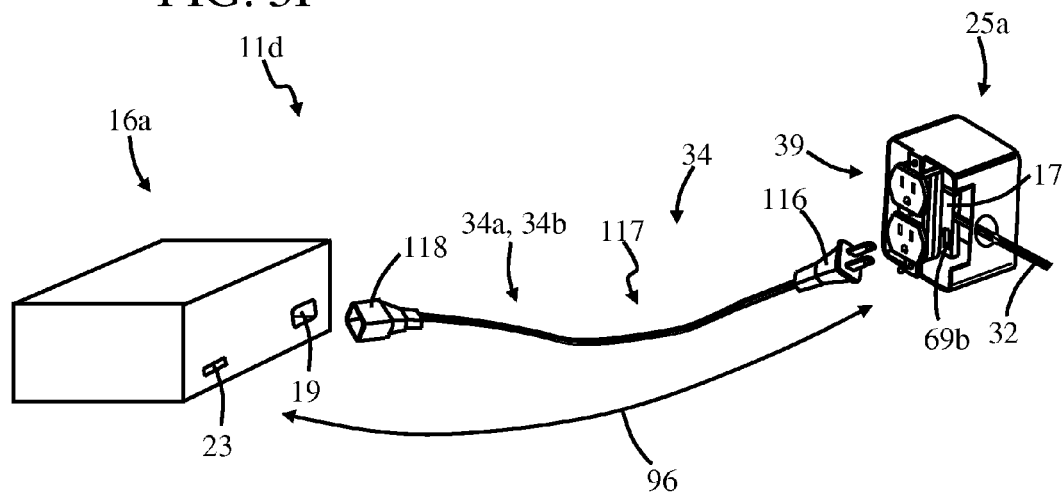

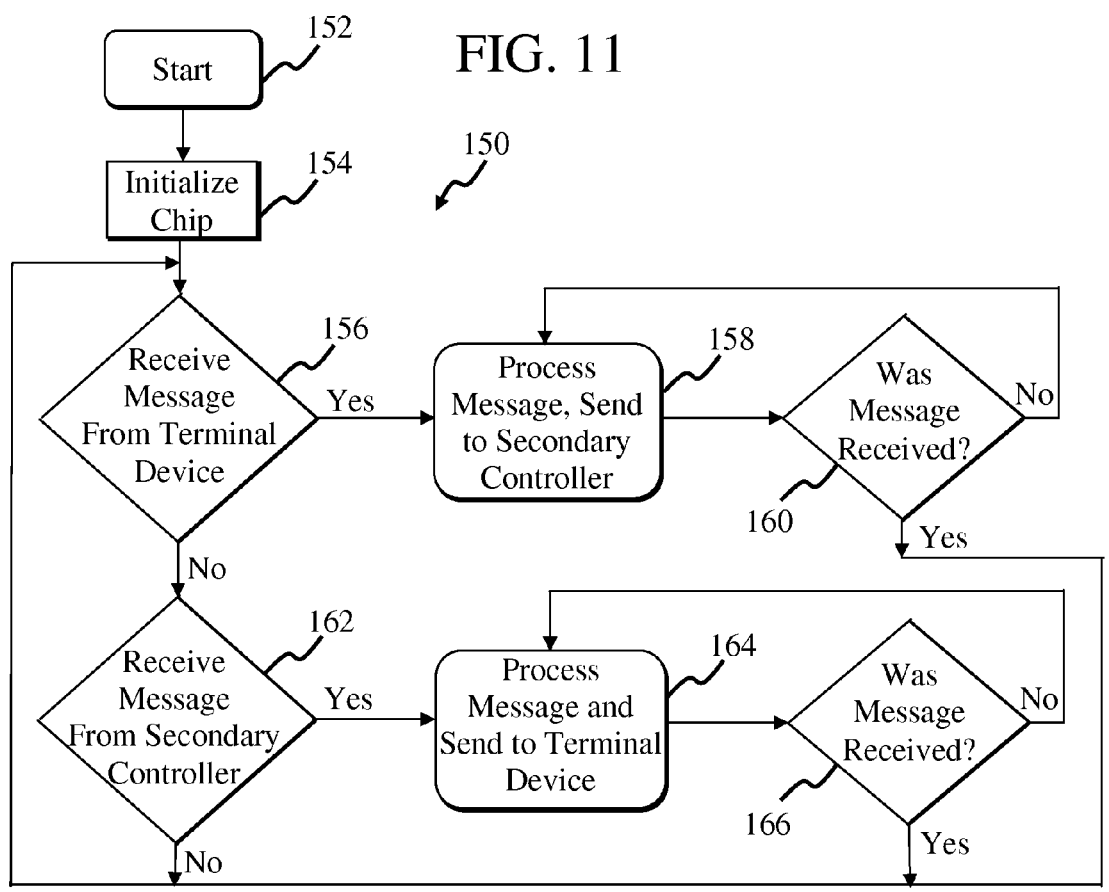

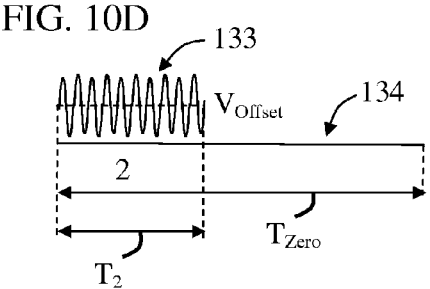
FIG. 10D
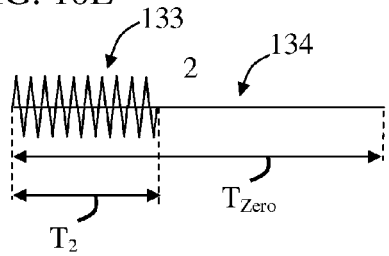
FIG. 10E
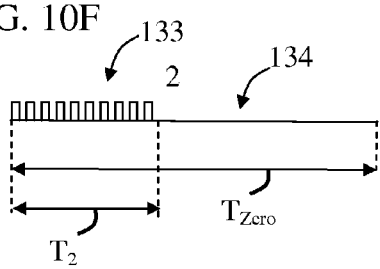
FIG. 10F
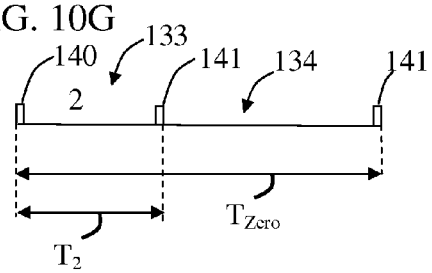
FIG. 10G
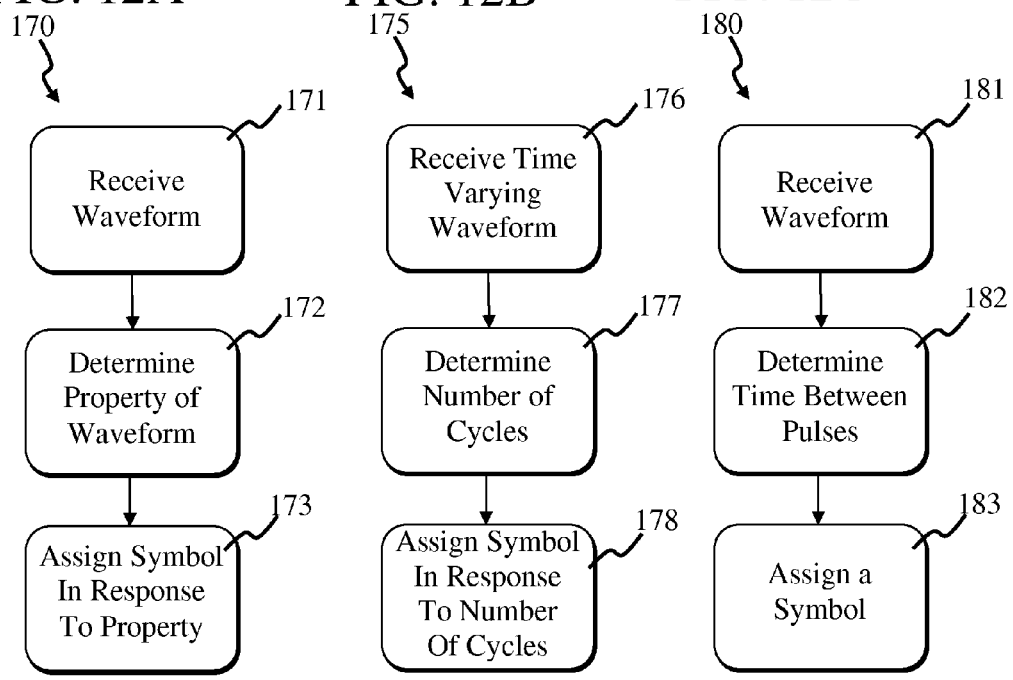

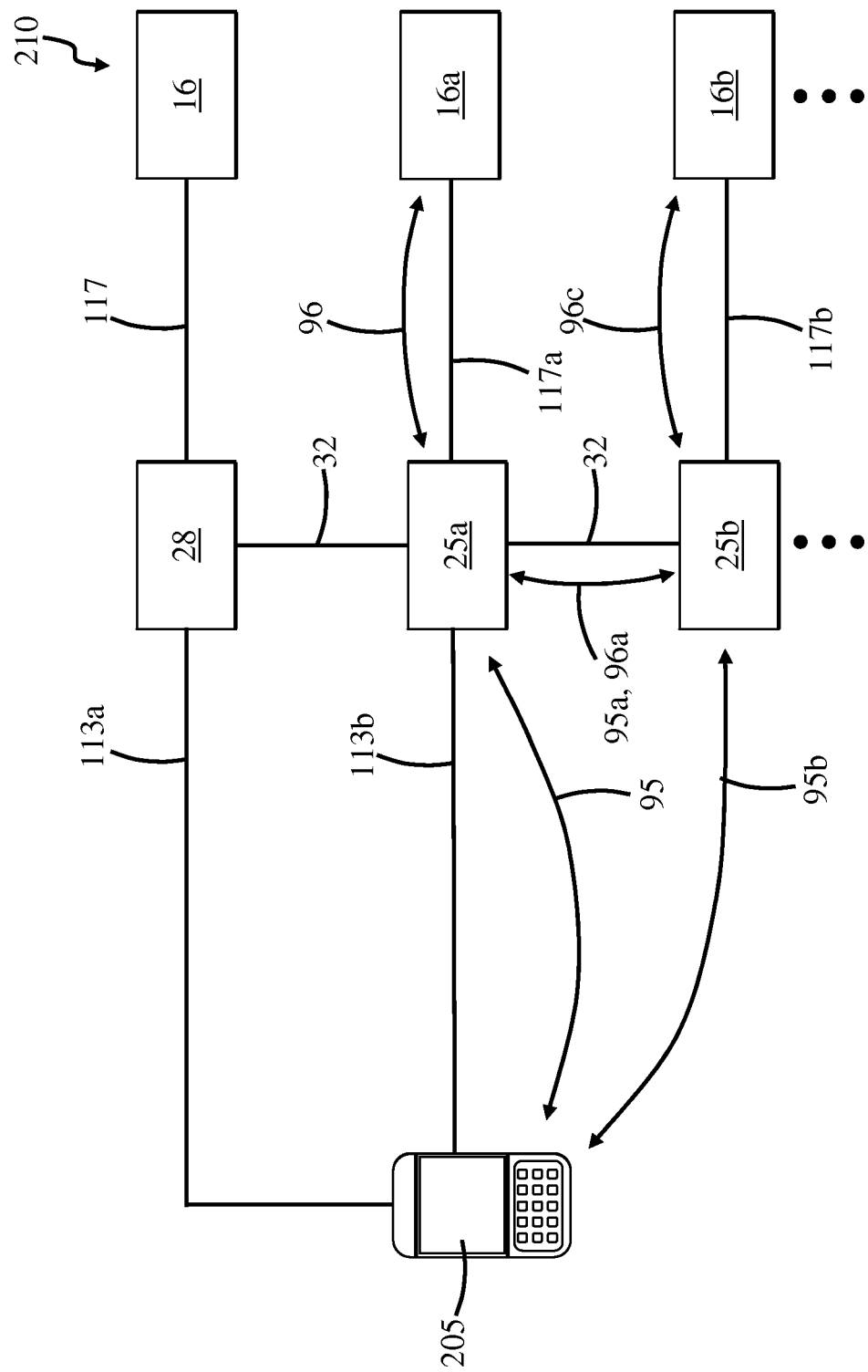

POWER MONITORING AND CONTROL SYSTEM AND METHOD

CROSS-REFERENCE TO RELATED APPLICATIONS

This application is a continuation-in-part of, and claims the benefit of, U.S. patent application Ser. No. 11/925,690, filed on Oct. 26, 2007, which issued on Jan. 10, 2012, as U.S. Pat. No. 8,095,243, which in turn is a continuation-in-part of, and claims the benefit of, U.S. Pat. No. 7,555,365, filed on Jul. 11, 2005, the contents of both of which are incorporated by reference as though fully set forth herein.

BACKGROUND OF THE INVENTION

1. Field of the Invention

This invention relates generally to power regulation and, more particularly, to monitoring and controlling the operation of electrical loads.

2. Description of the Related Art

Energy monitoring and control systems are widely used to provide centralized monitoring and control of an electrical load in an electrical system. The electrical load can be of many different types, such as heating, cooling, appliances and lighting devices. It is desirable to monitor and control the electrical load to monitor and control the energy usage by the electrical load. More information regarding such systems and electrical loads is provided in the Backgrounds of the above-identified related applications. Other references to note include U.S. Pat. Nos. 5,521,838, 5,563,455, 5,880,677, 5,978,569 and 7,379,997, as well as U.S. Patent Application Nos. 20060120008 and 20080031026.

Control systems are available for controlling household appliances from a central location. Some of these control systems use a power line modem, which is a transmitter/receiver capable of operating over conventional AC 120/240 volt (V) power lines. Examples of these types of control systems are disclosed in U.S. Pat. Nos. 4,174,517 and 4,418,333. In some of these control systems, a control unit is programmed to control a desired function within various electrical loads depending upon the time of day. For example, the control unit can control the operation of a lighting device and/or appliance. However, it is desirable to provide a way to control the operation of an electrical load, and to monitor the energy usage of the electrical load.

BRIEF SUMMARY OF THE INVENTION

The present invention involves a system which controls the amount of power consumed by an electrical load. The invention will be best understood from the following description when read in conjunction with the accompanying drawings.

BRIEF DESCRIPTION OF THE DRAWINGS

FIGS. 5C, 5D, 5E, 5F, 5G, 5H, 5I and 5J are perspective views of various embodiments of portions of the system of FIG. 1.

FIG. 11 is a block diagram of one embodiment of a method of controlling the power using the system of FIG. 1.

FIGS. 12A-12C are block diagrams of a method of encoding a symbol.

FIG. 14 is a block diagram of another embodiment of an energy management system.

DETAILED DESCRIPTION OF THE INVENTION

Figure 1:
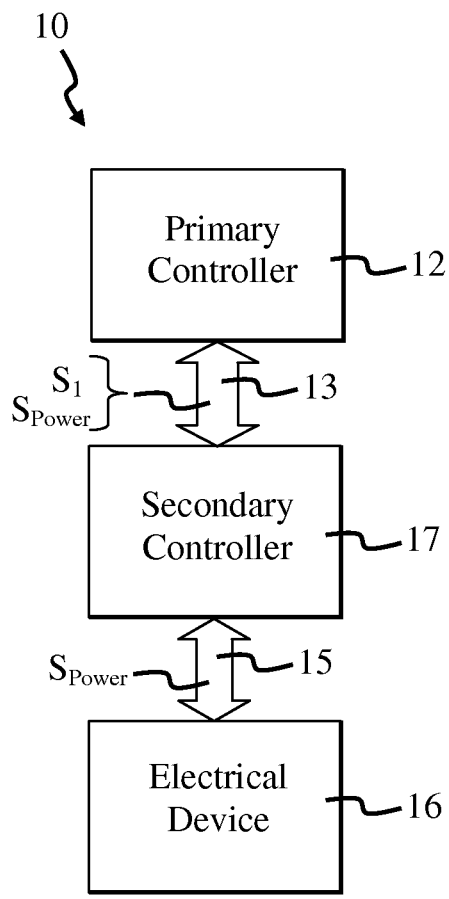
FIG. 1 is a block diagram of one embodiment of a system.

Disclosed herein are several systems which monitor and/or control the operation of one or more electrical loads. This is desirable because, for many different reasons, the operation of an electrical load is expensive. One reason the operation is expensive is because electrical power is expensive and the general trend is for it to increase in cost. Another reason the operation is expensive is because the electrical load has a certain lifetime after which it fails and needs to be fixed or replaced. The lifetime tends to decrease the more the electrical load is used, so in some instances, it is desirable to turn it off when not needed so its lifetime will not decrease as rapidly. It should be noted that like reference characters are used throughout the several views of the Drawings.

In some embodiments, the performance and/or efficiency of the electrical load is monitored by the system, which is desirable because the performance typically changes with time as the device's lifetime decreases. Hence, by monitoring the electrical load's performance and/or efficiency, it can be determined whether or not it is approaching the end of its useful lifetime. This can be done because electrical loads are generally manufactured to operate within a particular range of power consumption, voltage (V), current (A), and temperature. An indication that the electrical load is reaching the end of its useful lifetime and is about to fail occurs when the electrical load is operating outside one or more of these ranges. Further, newer and more efficient electrical loads are typically being developed, so the system can be used to determine whether it is more cost effective to replace an old electrical load with a newer and more efficient electrical load.

The system is useful in many different settings. For example, it can be used at home, in an office, or another setting to monitor and control the operation of electrical loads typically used in these places. The electrical load can be any type of electrical load, such as an appliance, television, computer, air conditioner, lamp, hair drier, refrigerator, etc. which are generally powered by an electrical outlet. The electrical load can also include wireless sensors, such as a motion sensor, smoke detector, temperature sensor, air pressure/quality sensor, and a switch sensor.

In one particular example, the system is used to monitor and control the electrical loads in the rooms of a hotel. If the room is currently unoccupied, then the system can turn one or more of the electrical loads in this room off to reduce operating costs. If the room is going to be occupied, then one or more of the electrical loads in the room can be provided with power by the system so they can be used by the occupants. If the room is currently being occupied, then the system can monitor and/or control the operation of the devices.

In another example, the system is used to determine the amount of power consumed over a particular period of time by the electrical loads in an office, home, or another building. This is desirable because sometimes there are two rates for electrical power, a low rate and a high rate. In some instances, the low rate is paid when the total power usage is below a predetermined threshold power value and the high rate is paid when the total power usage is above the predetermined threshold power value. Since it is desirable for the consumer to pay the lower rate, the system can be used to determine the total power usage so it can be compared to the predetermined threshold power value. In this way, the consumer will know how much power they can use before they go above the threshold power value and have to pay the higher rate.

FIG. 1 is a block diagram of one embodiment of a system 10. In this embodiment, system 10 includes a primary controller 12 in communication with a secondary controller 17 through a communication channel 13. Secondary controller 17 is in communication with an electrical load 16 through a communication channel 15. Communication channels 13 and 15 can be of many different types. In this example, they include conductive lines, such as AC 120 volt (V) wiring, which is typically used in building construction to flow signals therethrough. In other examples, however, channels 13 and 15 can be of other types which power and/or control signals can flow. For example, they can be optical fibers, wireless links, etc., or combinations thereof. In etc., or combinations thereof. In one example, power signals can flow through the electrical wires in channel 13 and control and monitoring signals can be sent through a wireless channel in channel 13.

One advantage of system 10 is that primary controller 12 can be positioned at one location and secondary controller 17 can be positioned at another location. For example, the locations can be at different positions in the same room or in different rooms in the same building. In other examples, the locations can even be in different buildings. In this way, system 10 can remotely monitor and/or control the operation of device 16.

In operation, channel 13 flows a power signal $S_{Power}$ and a signal $S_1$ between primary and secondary controllers 12 and 17 and channel 15 flows $S_{Power}$ to electrical load 16. Signal $S_{Power}$ provides power to primary and secondary controllers 12 and 17 and electrical load 16, and signal $S_1$ typically includes control and/or monitoring signals. The control signal in $S_1$ allows primary and secondary controllers 12 and 17 to control the operation of electrical load 16 and the monitoring signal in $S_1$ provides information to primary and secondary controllers 12 and 17 about the operation of electrical load 16. The information can be, for example, about the performance and efficiency of electrical load 16. Power signal $S_{Power}$ is typically a 120 volts AC (VAC) signal with a 60 Hertz (Hz) frequency, which is the United States standard. However, it should be noted that $S_{Power}$ can have different parameters which generally depend on the application and the country or location at which the power is provided. For example, many countries in Europe use 230 volts AC (VAC) at 50 Hz and Japan uses 100 volts AC (VAC) at 50 Hz or 60 Hz. Further, in the U.S. some heavy appliances use 240 volts AC (VAC) at 60 Hz.

In this embodiment, primary and secondary controllers 12 and 17 include both analog and digital circuitry, which is not shown in FIG. 1, but will be discussed in more detail below. The circuitry is coupled to channel 13 and separates signal $S_1$ from $S_{Power}$ so that $S_{Power}$ does not damage the circuitry and so that signal $S_1$ can be processed. After it is processed, signal $S_1$, with the same or different information, is then provided back to channel 13 and flowed to primary controller 12. In this way, control and/or monitoring signals are flowed between primary and secondary controllers 12 and 17 to control and/or monitor the operation of electrical load 16.

In one example of operation, primary controller 12 flows signal $S_1$ to controller 17 through channel 13. In response to this signal, controller 17 performs one or more tasks. In one task, controller 17 controls the operation of electrical load 16. For example, controller 17 can control the operation of electrical load 16 by turning it on and/or off as desired. In some examples, controller 17 can turn electrical load 16 on and/or off by activating and deactivating a switch (not shown) coupled to electrical load 16.

In another task, controller 17 determines the performance parameters of electrical load 16. The performance parameters can include, among others, the temperature of operation, power consumption, power consumption as a function of time, voltage, current, power factor and/or frequency of operation of electrical load 16. Performance parameters, such as the power factor and power consumption are typically determined by secondary controller 17 using the current and voltage of electrical load 16, but in other examples, they can be determined by primary controller 12. An advantage of having secondary controller 17 determine these performance parameters is that they will be more up-to-date in case electrical load 16 fails, and can provide a better indication of the operation of electrical load 16 before it fails. Having more up-to-date information is useful for troubleshooting device 16 to determine its reason for failure. It should be noted that electrical load can be of many different types, such as an appliance, computer, phone, water heater, air conditioner, powered door, window sensor, and power storage device, among others. Examples of appliances include a refrigerator, washer, dryer, water heater, water pump, powered door, door sensor, powered window, window sensor, television and power storage device, among others. In general, the electrical load consumes electrical energy during operation.

Figure 2:
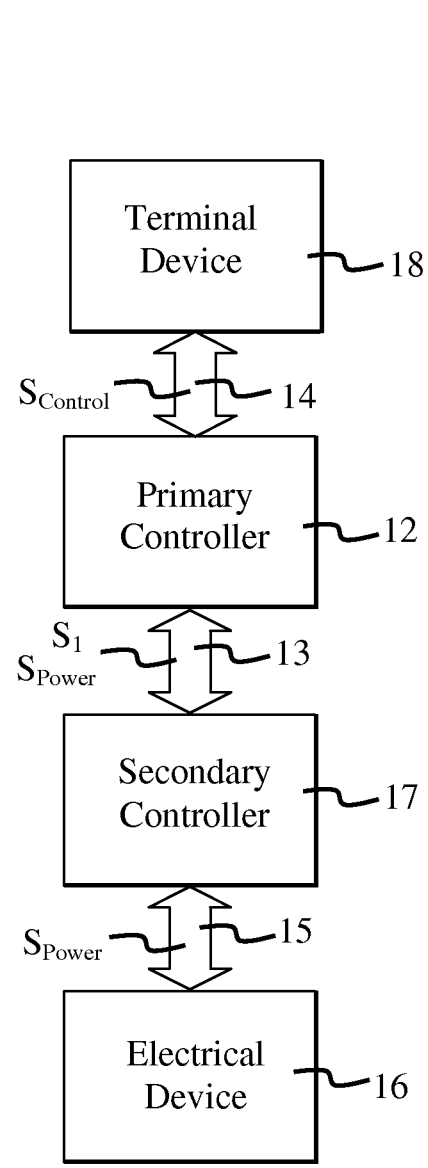
FIG. 2 is a block diagram of another embodiment of the system of FIG. 1.

FIG. 2 is a block diagram of a system 11, which includes many of the same components of system 10. In this embodiment, system 11 includes a terminal device 18 in communication with primary controller 12 through a communication channel 14. Communication channel 14 can be the same or similar to communication channels 13 and 15 discussed above. Terminal device 18 can be of many different types. For example, terminal device 18 can be a laptop computer, desktop computer, Pocket PC, Personal Digital Assistant (PDA) and mobile phone, among others, and communication channel 14 can be a data cable, such as a phone cord, an Ethernet cable, a Universal Serial Bus (USB), or an RS-232 serial cable. In some examples, channel 14 can be a wireless link so that device 18 and primary controller 12 communicate with each other wirelessly. The wireless link can be established in many different ways, such as by a wireless module. There are many different types of wireless modules that can be used, such as a ZigBee module. More information regarding Zig-Bee modules can be found in U.S. Pat. Nos. 7,260,360, 7,742,894 and 7,957,697.

In operation, terminal device 18 flows a control signal $S_{Control}$ to primary controller 12 through communication channel 14. In some situations, signal $S_{Control}$ indicates to primary controller 12 what information (temperature, frequency, power, current, voltage, etc.) terminal device 18 is requesting about electrical load 16. In some situations, signal $S_{Control}$ can also indicate to primary controller 12 if it is desired to control the operation of electrical load 16, such as by turning electrical load 16 on or off. In response to receiving control signal $S_{Control}$, primary controller 12 flows signal $S_1$ to secondary controller 17. In response to receiving signal $S_1$, secondary controller 17 controls and/or monitors device 16, as discussed above with FIG. 1. In some instances, controller 17 flows information about device 16 back to primary controller 12 through channel 13. Primary controller 12 provides this information to terminal device 18 through channel 14.

One advantage of the embodiment of FIG. 2 is that a software program can be operated by terminal device 18, wherein the software program flows information and/or commands to primary and secondary controllers 12 and 17. It should be noted that information can be flowed in many different ways, such as by transmitting and/or receiving it. Terminal device 18 also displays the information in a convenient manner for the user. In this way, terminal device 18 provides the user an interface with primary and secondary controllers 12 and 17. As mentioned above, primary and secondary controllers 12 and 17 can determine some of the performance parameters of device 16, but in this embodiment, these performance parameters can be determined by terminal device 18.

Figure 3A:
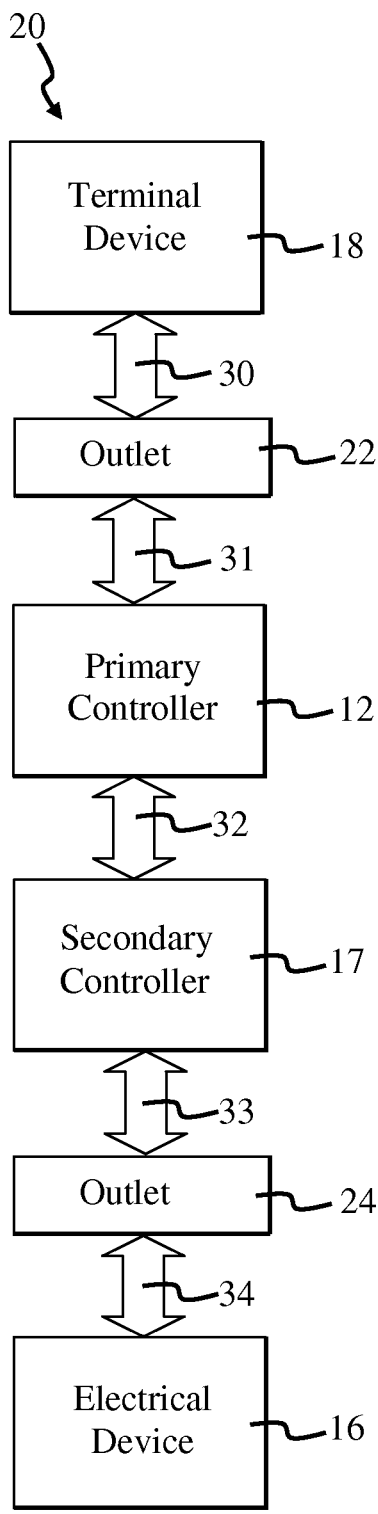
FIG. 3A is a block diagram of another embodiment of the system of FIG. 1.
Figure 3B:
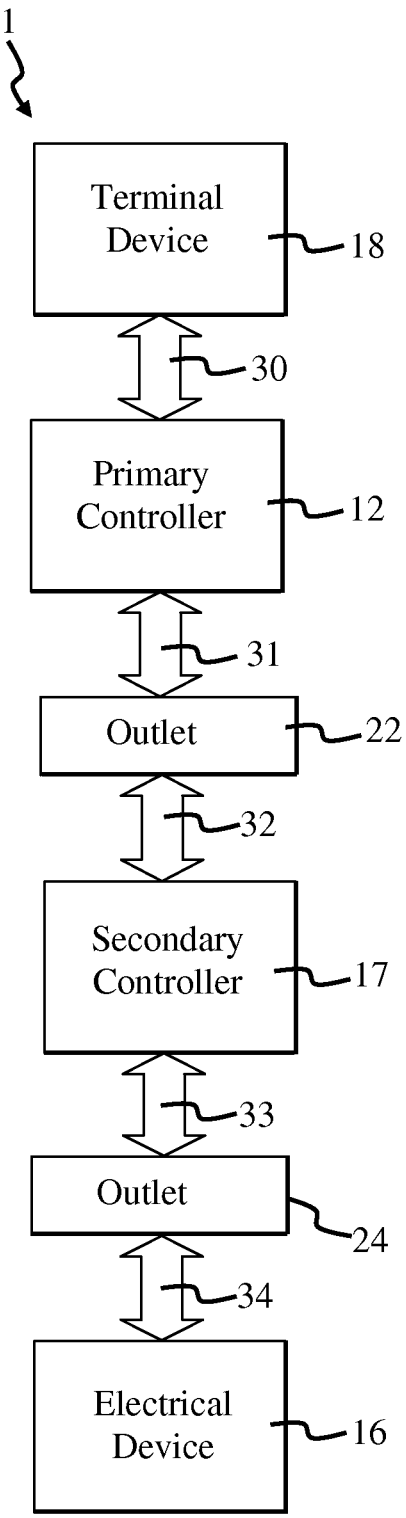
FIG. 3B is a block diagram of another embodiment of the system of FIG. 1.

FIGS. 3A and 3B are block diagrams of systems 20 and 21, respectively, which includes many of the same components of systems 10 and/or 11. In this embodiment, system 20 includes an outlet 22 between terminal device 18 and primary controller 12 and an outlet 24 between secondary controller 17 and electrical load 16. Terminal device 18 is in communication with outlet 22 through a communication channel 30 and primary controller 12 is in communication with outlet 22 through a communication channel 31. Secondary controller 17 is in communication with outlet 24 through a communication channel 33 and electrical load 16 is in communication with outlet 24 through a communication channel 34. Further, primary and secondary controllers 12 and 17 are in communication with each other through a communication channel 32.

In this embodiment, system 21 is similar to system 20 except that primary controller 12 is in communication with terminal device 18 through communication channel 30 and to outlet 22 through communication channel 31. Outlet 22 is in communication with secondary controller 17 through communication channel 32. Secondary controller 17 is in communication with outlet 24 through communication channel 33 and outlet 24 is in communication with electrical load 16 through communication channel 34.

It should be noted that communication channels 30-34 can be the same or similar to channels 13-15 discussed above in conjunction with FIGS. 1 and 2. In this embodiment, however, communication channel 34 is embodied as a power cord. Signal $S_{Power}$ flows through communication channel 34 between outlet 24 and electrical load 16. In some embodiments, communication channels 32-33 are embodied as conductive lines used in electrical wiring for building construction. Further, in system 20, channel 30 is embodied as a data cable, which can be received by terminal device 18 and outlet 22, and channel 31 is embodied as electrical wiring used in building construction. Similarly, in system 21, channel 30 is embodied as a data cable which can be received by terminal device 18 and controller 17, and channel 31 is embodied as a data cable which can be received by primary controller 12 and outlet 22. The operation of systems 20 and 21 are the same or similar to the operation of systems 10 and 11 discussed above in conjunction with FIGS. 1 and 2. In this embodiment, primary controller 12 is separate from outlet 22 and secondary controller 17 is separate from outlet 24. In other embodiments, however, primary controller 12 can be integrated with outlet 22 and/or secondary controller 17 can be integrated with outlet 24, as will be discussed in more detail presently.

Figure 4A:
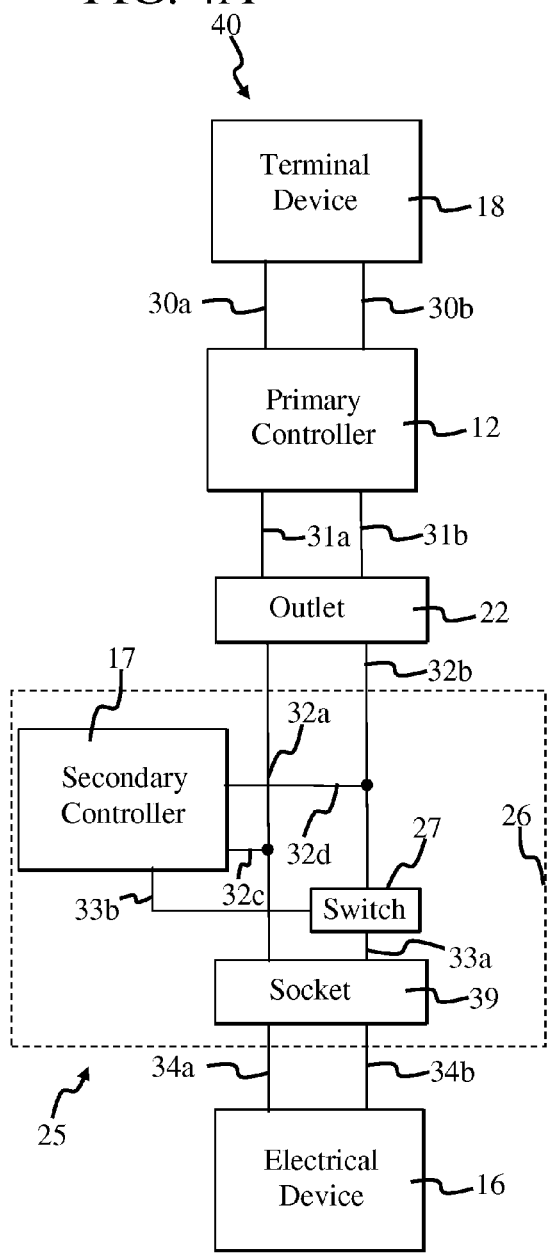
FIG. 4A is a block diagram of another embodiment of the system of FIG. 1.
Figure 4B:
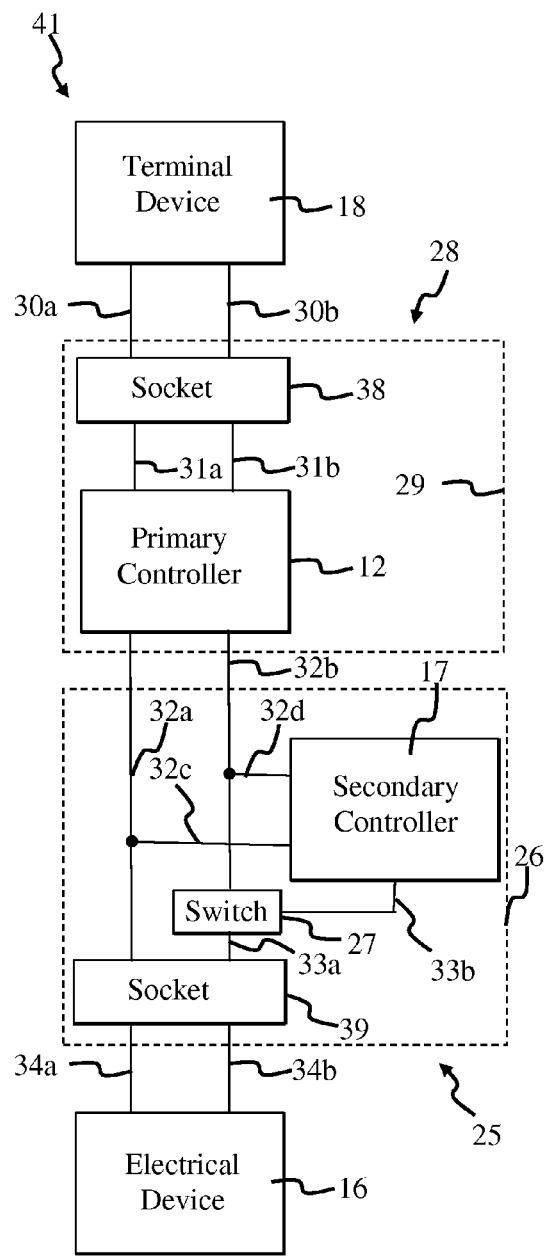
FIG. 4B is a block diagram of another embodiment of the system of FIG. 1.

FIGS. 4A and 4B are block diagrams of systems 40 and 41, respectively, which includes many of the same components of systems 10, 11, 20 and/or 21. One difference, however, is that the primary and/or secondary controllers are integrated with corresponding electrical outlets. One advantage of integrating primary and/or secondary controllers with corresponding electrical outlets is that systems 40 and 41 are more compact.

In system 40 of FIG. 4A, terminal device 18 is in communication with primary controller 12 through conductive lines 30a and 30b and primary controller 12 is in communication with outlet 22 through conductive lines 31a and 31b. Outlet 22 is in communication with an outlet 25 through conductive lines 32a and 32b and outlet 25 is in communication with electrical load 16 through conductive lines 34a and 34b. In this embodiment, outlet 25 includes secondary controller 17 in communication with conductive lines 32a and 32b through conductive lines 32c 32a and 32b through conductive lines 32c and 32d, respectively. A switch 27 has an input connected to conductive line 32b and an output connected to a conductive line 33a. A conductive line 33b is connected between a control terminal of switch 27 and secondary controller 17 so that secondary controller can control its operation. Conductive lines 32a and 33a are connected to separate inputs of a socket 39 and separate outputs of socket 39 are connected to conductive lines 34a and 34b.

Figure 5A:
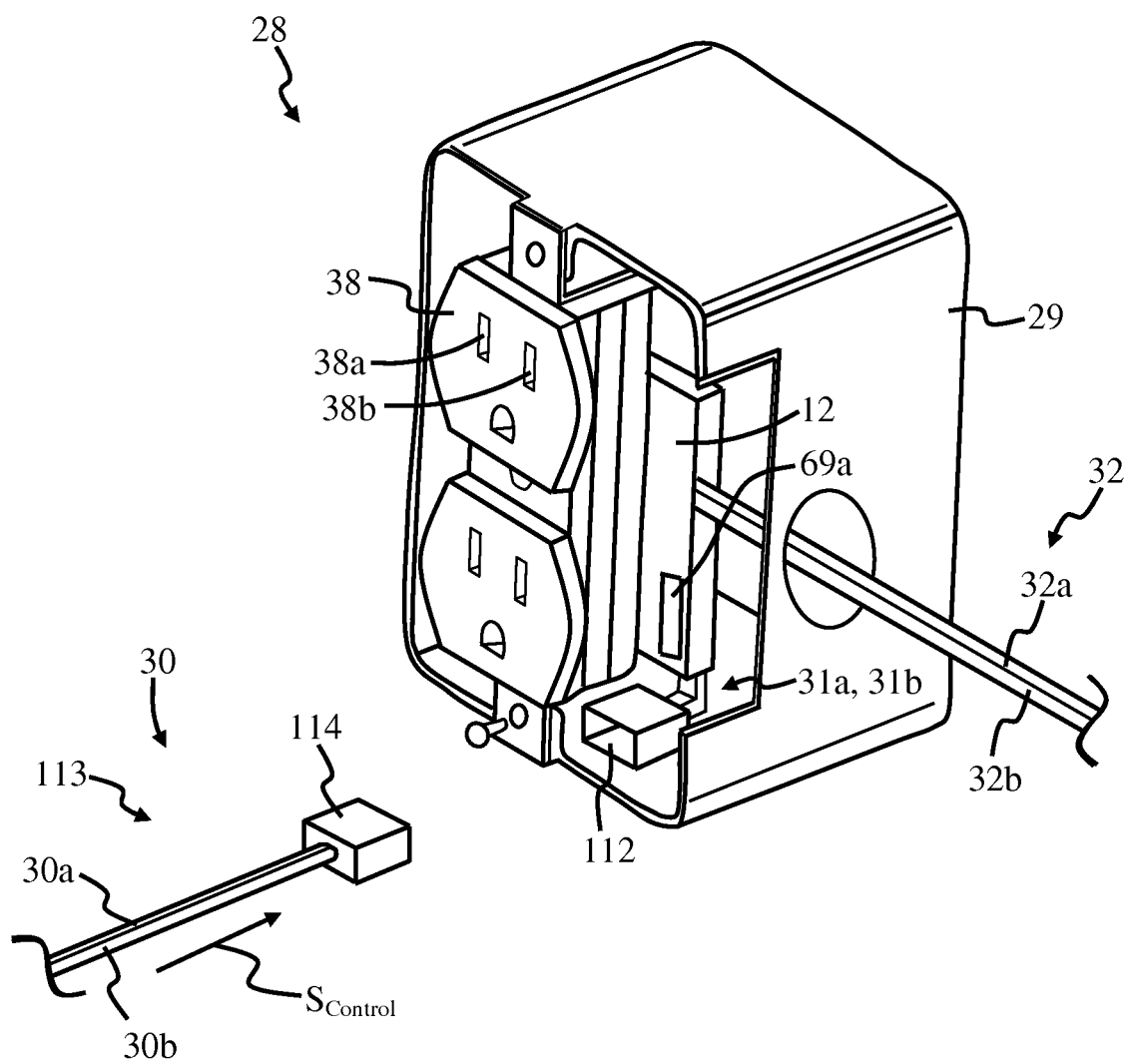
FIGS. 5A and 5B are perspective views of electrical outlets of the systems of FIGS. 4A and 4B.
Figure 5B:
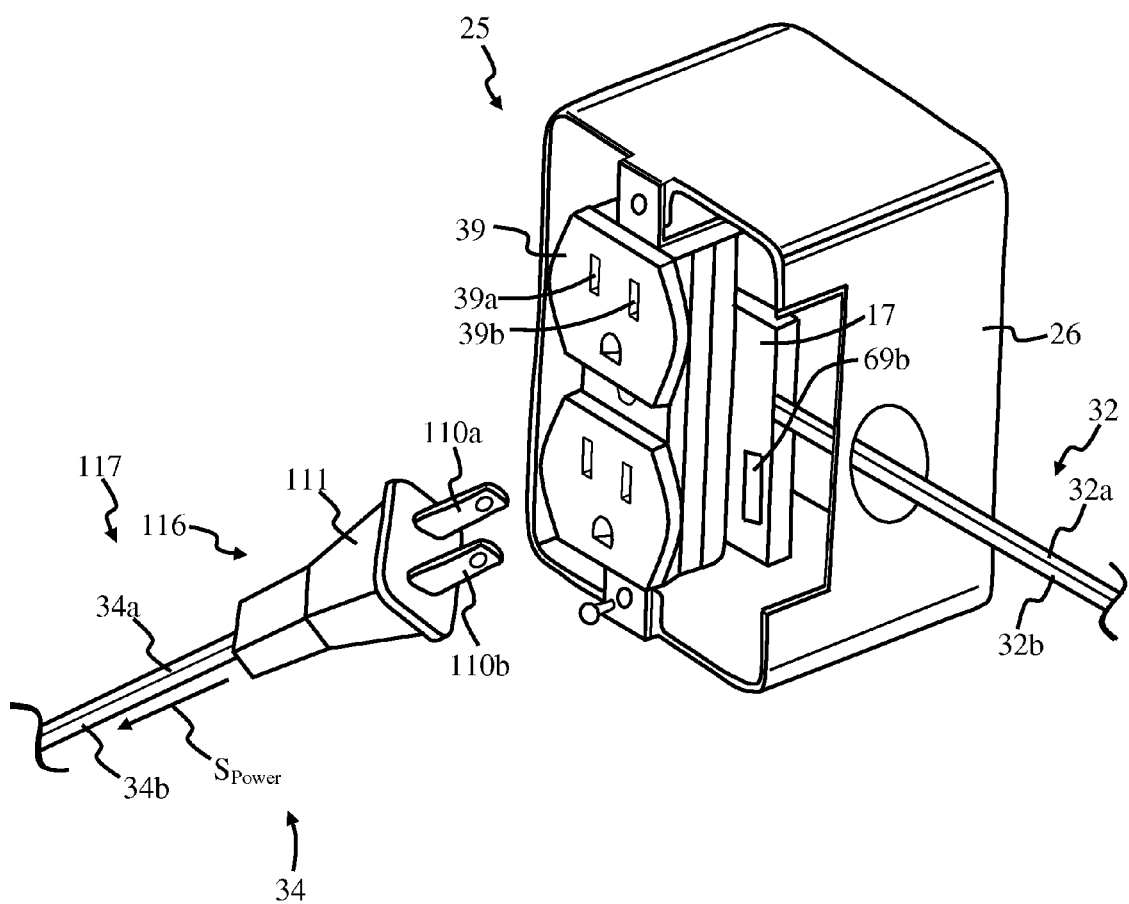

Secondary controller 17 and switch 27 are housed by an outlet housing 26 (See FIG. 5B). In this way, these components are integrated with outlet 25. In other examples, however controller 17 and/or switch 27 can be positioned outside housing 26. The switch can be of many different types. In this example, the switch is a relay, such as a bi-stable magnetic relay. The relay can flow $S_{Power}$ through socket 39 to electrical load 16 so it is on and interrupt the flow of $S_{Power}$ through socket 39 so it is off. In other examples, the switch can be a transistor or another type of switch known in the art.

In system 40, conductive lines 30a and 30b are embodied as separate conductive wires typically included in an RS-232 cable which is known in the art. The RS-232 cable has a first connector on one end which can be received by a connector receptacle on terminal device 18. The RS-232 cable also has a second connector on its other end which can be received by an input connector receptacle on primary controller 12. Conductive lines 31a and 31b are embodied as separate conductive wires typically included in a power cord. In this example, the power cord is modified so it has a connector on one end which can be received by an output connector receptacle on primary controller 12 and a connector on its other end which is embodied as a plug that can be received by outlet 22.

In system 41 of FIG. 4B, terminal device 18 is in communication with an electrical outlet 28 through conductive lines 30a and 30b. Electrical outlet 28 is in communication with electrical outlet 25 through conductive lines 32a and 32b. In this embodiment, outlet 28 includes a socket 38 with separate outputs connected to conductive lines 30a and 30b. Separate inputs of socket 38 are connected to separate inputs of primary controller 12 through conductive lines 31a and 31b. Separate outputs of primary controller 12 are connected to conductive lines 32a and 32b. Primary controller 12 is housed by an outlet housing 29 (See FIG. 5A) of outlet 28. In this way, this component is integrated with outlet 28.

In system 41, conductive lines 30a and 30b are embodied as separate conductive wires typically included in an RS-232 cable. In this example, the cable is modified so it has a connector on one end, which can be received by a connector receptacle on terminal device 18, and a connector on its other end, which can be received by a connector receptacle on socket 38. It should be noted that the various connectors and connector receptacles can be of many different types known in the art. For example, they can be those used in phone lines, power cords, RS 232 cables, Ethernet cables, Universal Serial Bus (USB) cables, etc. Further, these connectors and connector receptacles can be provided in many different combinations on opposite ends of the same cable, such as in the modified cable and power cords discussed above.

FIGS. 5A and 5B are perspective views of outlets 28 and 25, respectively. In FIG. 5A, outlet 28 includes housing 29 which houses primary controller 12. In some embodiments, primary controller 12 includes a wireless module 69a, which is discussed in more detail below. Wireless module 69a can be of many different types, such as a ZigBee module.

In this embodiment, socket 38 is carried by housing 29 and has slots 38a and 38b with separate contacts (not shown) connected to separate terminals of primary controller 12 through conductive lines 31a and 31b (FIGS. 4A and 4B). In this embodiment, signal $S_{Control}$ is provided to primary controller 12 through a cable 113. Cable 113 includes conductive lines 30a and 30b which are connected to a connector 114. Connector 114 is shaped to be received by a connector receptacle 112, which is coupled to primary controller 12 through conductive lines 31a and 31b.

In FIG. 5B, outlet 25 includes housing 26 which houses controller 17 and switch 27 (not shown), wherein switch 27 is discussed in more detail below. In some embodiments, controller 17 includes a wireless module 69b, which is discussed in more detail below. Wireless module 69b can be of many different types, such as a ZigBee module.

In this embodiment, outlet 25 does not include connector 112, although it can in other embodiments. Instead, a power cord 117 includes conductive lines 34a and 34b (FIGS. 4A and 4B), which are connected to a power plug 116. Power cord 117 provides signal $S_{Power}$ to electrical load 16 (not shown). Conductive lines 34a and 34b extend through a housing 111 of power plug 116 where they are connected to prongs 110a and 110b, respectively, of power plug 116. Prongs 110a and 110b can be received by slots 39a and 39b of socket 39 so that they connect to terminals (not shown) therein connected to conductive lines 32a and 33a (FIGS. 4A and 4B).

Figure 5C:
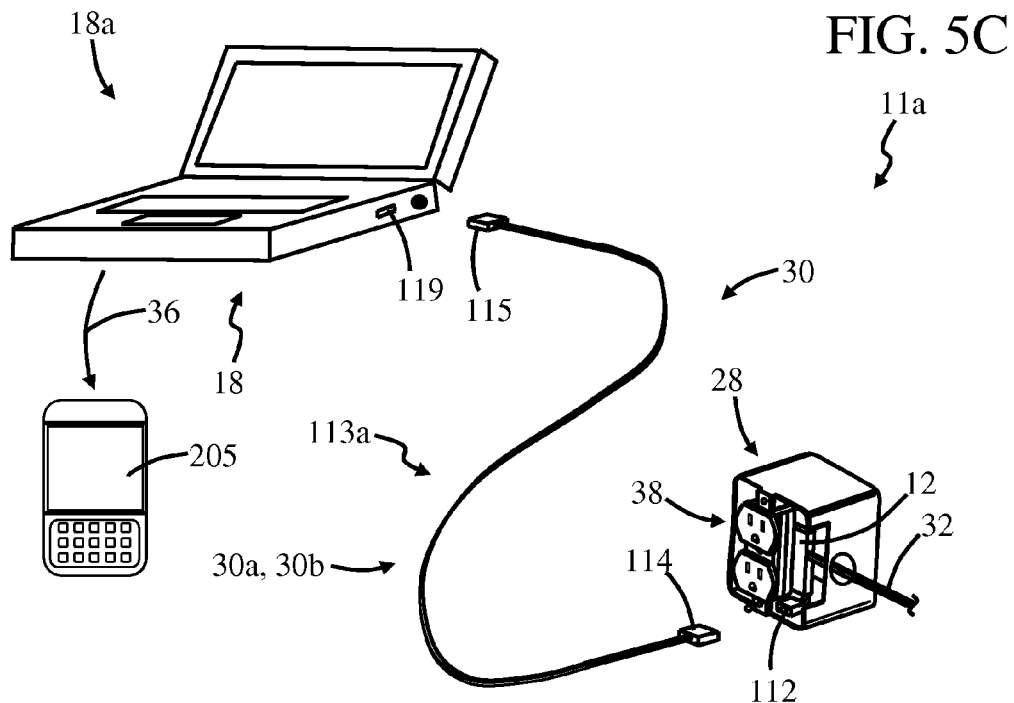

FIG. 5C is a perspective view of a system 11a. In this embodiment, system 11a includes terminal device 18, which is embodied as a computer. In particular, terminal device 18 is embodied as a laptop computer 18a. It should be noted that, in the embodiments of the systems disclosed herein, terminal device 18 can be embodied as another type of device, such as a phone. The phone can be of many different types, such as a mobile phone 205, as indicated by a substitution arrow 36. System 11a includes electrical outlet 28, which is shown in FIG. 5A.

Communication channel 30 is established between terminal device 18 and electrical outlet 28. In this embodiment, system 11a includes a data cable 113a which establishes communication channel 30. Data cable 113a can be of many different types. In this embodiment, data cable 113a includes conductive lines 30a and 30b (FIG. 5A) and data connectors 114 and 115. Data connectors 114 and 115 are connected to opposed ends of conductive lines 30a and 30b. Data connectors 114 and 115 can be of many different types of connectors used with computers. In this embodiment, data connector 115 is an Ethernet connector which is repeatably moveable between connected and unconnected conditions with a data connector receptacle 119 of laptop computer 18a. As discussed in more detail above, data connector 114 is repeatably moveable between connected and unconnected conditions with data connector receptacle 112 of electrical outlet 28. Data connectors 114 and 115 can be the same type of data connectors, or they can be different types of data connectors.

Communication channel 30 allows the flow of a signal, such as signal $S_{Control}$, between terminal device 18 and electrical outlet 28. In this way, signal $S_{Control}$ flows through data cable 113a and between terminal device 18 and electrical outlet 28. In particular, communication channel 30 allows the flow of signal $S_{Control}$ between terminal device 18 and primary controller 12 of electrical outlet 28. In this way, signal $S_{Control}$ flows through data cable 113a and between terminal device 18 and primary controller 12 of electrical outlet 28.

Figure 5D:
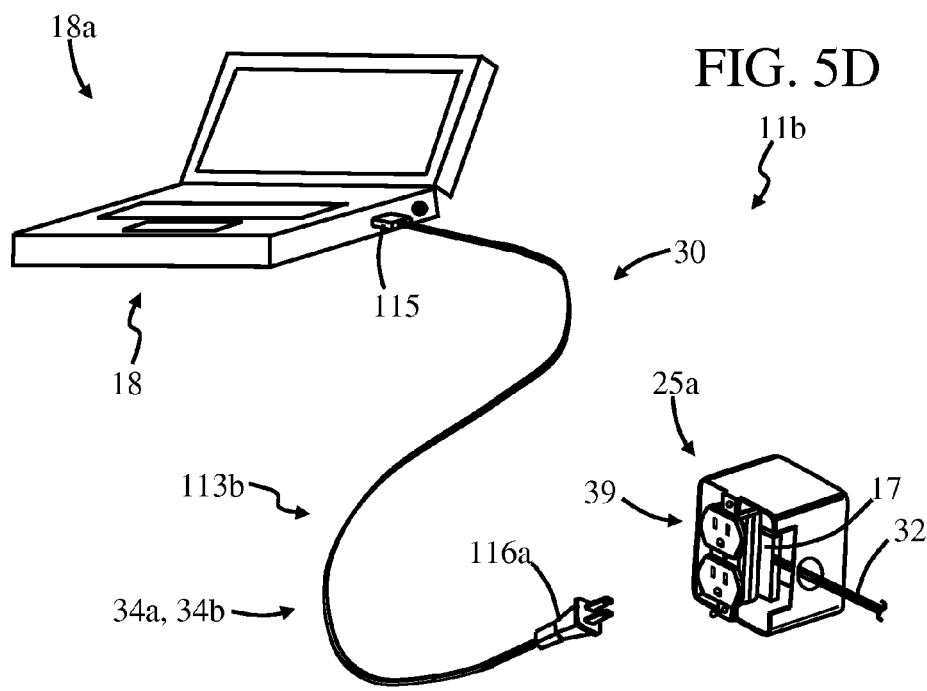

FIG. 5D is a perspective view of a system 11b. In this embodiment, system 11b includes terminal device 18, which is embodied as a computer. In particular, terminal device 18 is embodied as laptop computer 18a. System 11b includes an electrical outlet 25a, which is the same type of electrical outlet shown in FIG. 5B.

Communication channel 30 is established between terminal device 18 and electrical outlet 28. In this embodiment, system 11b includes a data cable 113b which establishes communication channel 30. Data cable 113b can be of many different types. In this embodiment, data cable 113b includes conductive lines 34a and 34b (FIG. 5B) and a data connector 115 and connector 115 and power plug 116a. In this embodiment, power plug 116a is the same type of power plug shown in FIG. 5B. Data connector 115 and power plug 116a are connected to opposed ends of conductive lines 34a and 34b. Data connector 115 can be of many different types of connectors used with computers. In this embodiment, data connector 115 is an Ethernet connector which is repeatably moveable between connected and unconnected conditions with data connector receptacle 119 of laptop computer 18a. Power plug 116a is repeatably moveable between connected and unconnected conditions with socket 39 of electrical outlet 28.

Communication channel 30 allows the flow of a signal, such as signal $S_{Control}$, between terminal device 18 and electrical outlet 25a. In this way, signal $S_{Control}$ flows through data cable 113b and between terminal device 18 and electrical outlet 25a. In particular, communication channel 30 allows the flow of signal $S_{Control}$ between terminal device 18 and secondary controller 17 of electrical outlet 25a. In this way, signal $S_{Control}$ flows through data cable 113b and between terminal device 18 and secondary controller 17 of electrical outlet 25a.

FIG. 5E is a perspective view of a system 11c. In this embodiment, system 11c includes terminal device 18, which is embodied as a computer. In particular, terminal device 18 is embodied as laptop computer 18a. System 11c includes electrical outlet 25a, which is the same type of electrical outlet shown in FIG. 5B.

Communication channel 30 is established between terminal device 18 and electrical outlet 28 by establishing a wireless link 95 therebetween. In this embodiment, wireless link 95 is established between a wireless module 120 of laptop computer 18*a* and wireless module 69*b* of electrical outlet 25*a*. Wireless link 95 will be discussed in more detail below. It should be noted that communication channel 30 can also be established in system 11*c* by using data cables 113*a* and 113*b*, as discussed in more detail above.

Communication channel 30 allows the flow of a signal, such as signal $S_{Control}$, between terminal device 18 and electrical outlet 25*a*. In this way, signal $S_{Control}$ flows through wireless link 95 and between terminal device 18 and electrical outlet 25*a*. In particular, communication channel 30 allows the flow of signal $S_{Control}$ between terminal device 18 and secondary controller 17 of electrical outlet 25*a*. In this way, signal $S_{Control}$ flows through wireless link 95 and between terminal device 18 and secondary controller 17 of electrical outlet 25*a*.

FIG. 5F is a perspective view of a system 11*d*. In this embodiment, system 11*d* includes an electrical load 16*a*, which is capable of wireless communication, as will be discussed in more detail below. System 11*d* includes electrical outlet 25*a*, which is the same type of electrical outlet shown in FIG. 5B.

Communication channel 34 is established between electrical load 16*a* and electrical outlet 25*a*. In this embodiment, system 11*d* includes power cord 117 which establishes communication channel 34. Power cord 117 includes conductive lines 34*a* and 34*b*, which are connected to power plug 116. Power cord 117 can be of many different types. In this embodiment, power cord 117 includes conductive lines 34*a* and 34*b* (FIGS. 4A and 4B) and power plugs 116 and 118. Power plugs 116 and 118 are connected to opposed ends of conductive lines 34*a* and 34*b*.

In this embodiment, power plug 116 is repeatably moveable between connected and unconnected conditions with socket 39 of electrical outlet 25*a*. Further, power plug 118 is repeatably moveable between connected and unconnected conditions with a power plug receptacle 19 of electrical load 16*a*. Power plugs 116 and 118 can be of many different types of plugs used with electrical loads. Power plugs 116 and 118 can be the same type of power plugs, or they can be different types of power plugs. In this embodiment, power plugs 116 and 118 are male and female power plugs, respectively.

Power cord 117 provides signal $S_{Power}$ to electrical load 16*a*. Conductive lines 34*a* and 34*b* extend through housing 111 of power plug 116 where they are connected to prongs 110*a* and 110*b*, respectively, of power plug 116. Prongs 110*a* and 110*b* can be received by slots 39*a* and 39*b* of socket 39 so that they connect to terminals (not shown) therein connected to conductive lines 32*a* and 33*a* (FIGS. 4A and 4B).

It should be noted that signal $S_{Control}$ can also flow through power cord 117, as discussed in more detail above. Further, in some embodiments, signal $S_{Control}$ can flow between electrical load 16*a* and electrical outlet 25*a* through a wireless link, such as wireless link 96. In this embodiment, wireless link 96 is established between wireless module 69*b* of electrical outlet 25*a* and a wireless module 23 of electrical load 16*a*. In this way, the operation of electrical load 16*a* is controllable in response to flowing a wireless signal between it and electrical outlet 25*a*. Wireless module 23 can be of many different types, such as a ZigBee module.

Figure 5G:
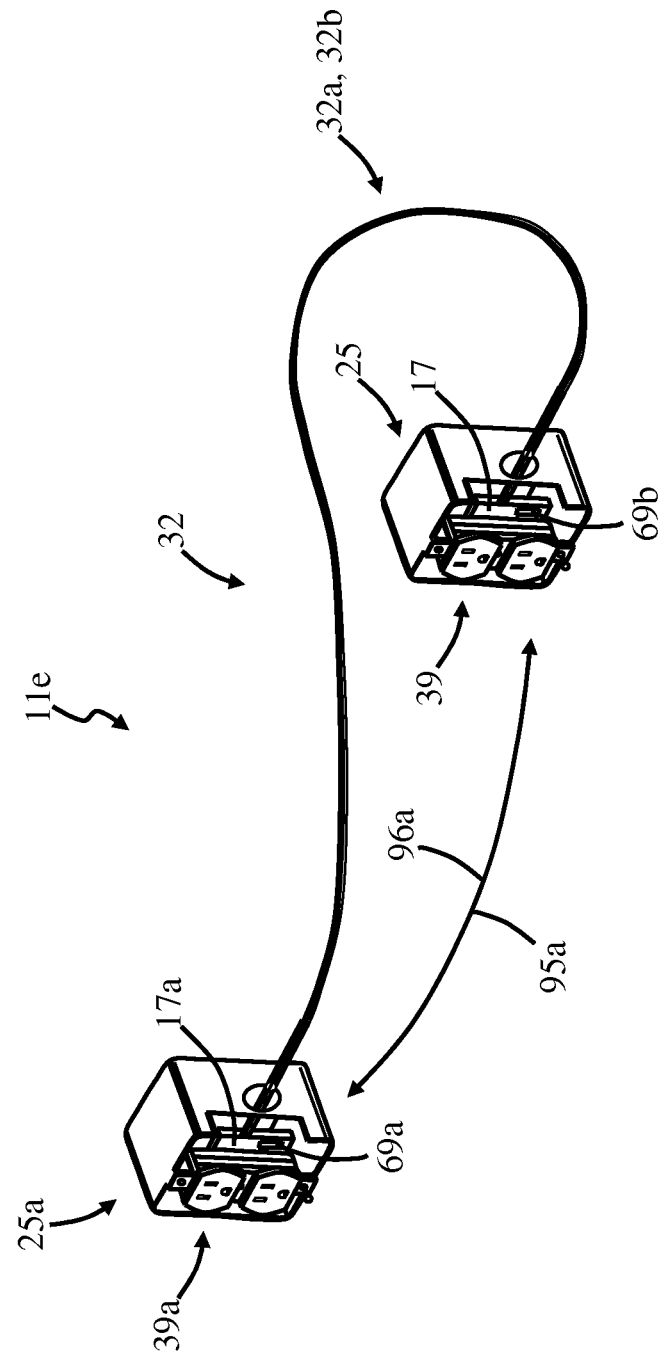

FIG. 5G is a perspective view of a system 11*e*. In this embodiment, system 11*e* includes electrical outlets 25 and 25*a* in communication with each other. It should be noted that electrical outlet 25 can be replaced with electrical outlet 28. Further, electrical outlet 25*a* can be replaced with electrical outlet 28, such as will be described below with FIG. 5H. In this embodiment, electrical outlet 25*a* includes a controller 17*a*, which includes wireless module 69*a*. It should be noted that controller 17*a* can correspond to the primary or secondary controllers discussed herein. Electrical outlet 39*a* includes a socket 39*a*, which can correspond to the sockets discussed herein, such as sockets 38 and 39.

In this embodiment, electrical outlets 25 and 25*a* are in communication with each other through communication link 32. Communication link 32 can be established in many different ways, several of which are discussed in more detail above. In this embodiment, communication link is established through conductive lines 32*a* and 32*b*, which are shown in FIGS. 5A and 5B.

Conductive lines 32*a* and 32*b* allow signal $S_{Power}$ to flow between electrical outlets 25 and 25*a*. In some embodiments, conductive lines 32*a* and 32*b* allow control signal $S_{Control}$ to flow between electrical outlets 25 and 25*a*.

In some embodiments, signal $S_{Control}$ can flow between electrical outlets 25 and 25*a* through a wireless link, such as wireless links 95*a* and 96*a*. In this embodiment, wireless link 95*a* is established between wireless modules 69*a* and 69*b* of electrical outlets 25*a* and 25, respectively, by wireless module 69*a*. Further, wireless link 95*b* is established between wireless modules 69*a* and 69*b* of electrical outlets 25*a* and 25, respectively, by wireless module 69*b*. In this way, the operation of controllers 17 and 17*a* is controllable in response to flowing a wireless signal between electrical outlets 25 and 25*a*.

The systems described above can be combined with each other in many different ways to provide more functionality. Several embodiments of such systems will be discussed in more detail presently.

Figure 5H:
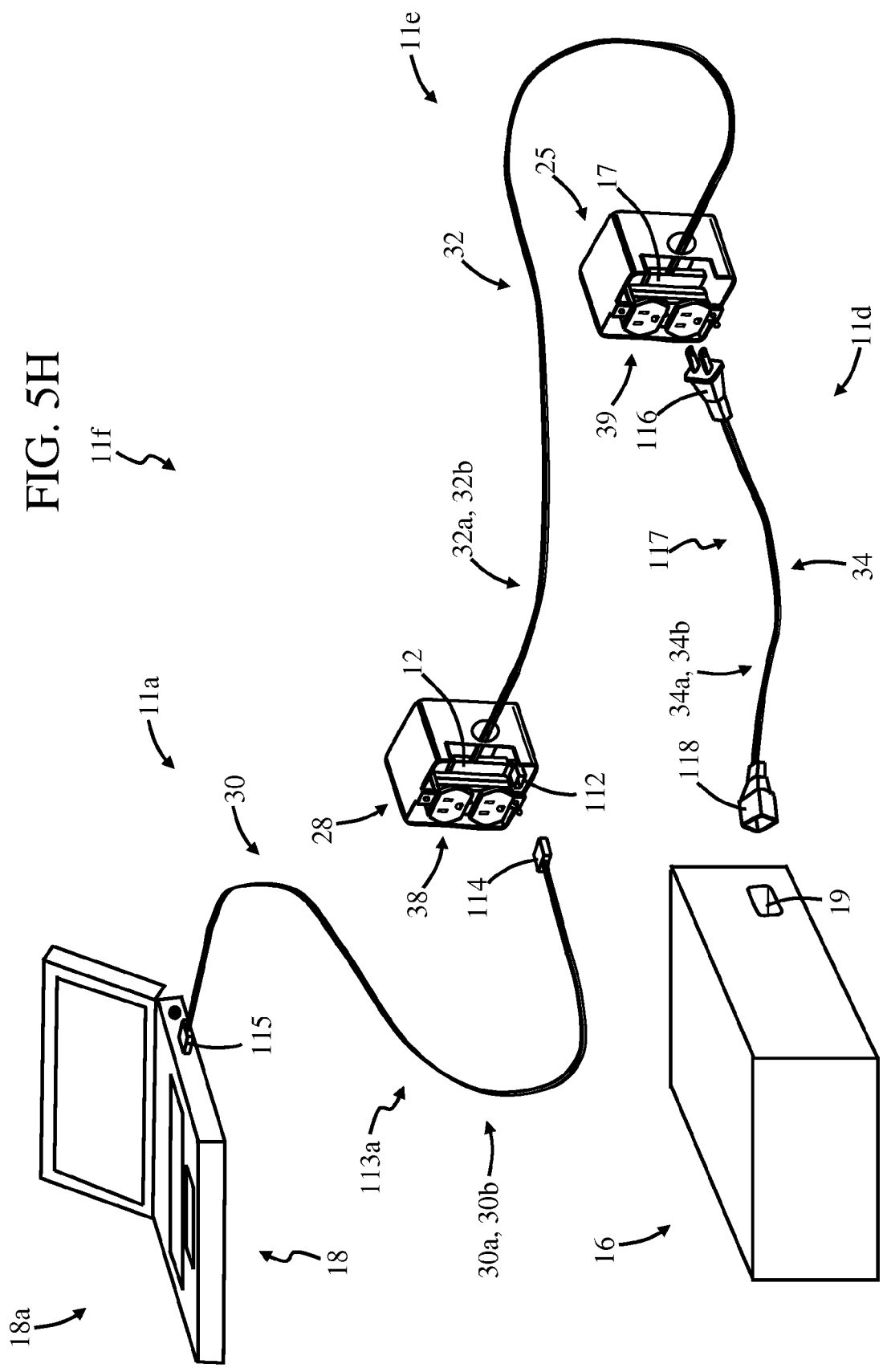

FIG. 5H is a perspective view of a system 11*f*. In this embodiment, system 11*f* includes systems 11*a*, 11*d* and 11*e*, which are discussed in more detail above with FIGS. 5C, 5F and 5G, respectively. In this embodiment, system 11*e* includes electrical outlet 28, which has replaced electrical outlet 25*a* of FIG. 5G. Hence, terminal device 18 is in communication with electrical outlet 28 through data cable 113*a* in a manner described in more detail above with FIG. 5C. Further, electrical outlets 25 and 28 are in communication with each other in a manner described in more detail above with FIG. 5G. Electrical load 16 is in communication with electrical outlet 25 in a manner described in more detail above with FIG. 5F.

In operation, terminal device 18 flows control signal $S_{Control}$ to primary controller 12 through data cable 113*a*. In response to signal $S_{Control}$, primary controller 12 performs one or more tasks, such as those mentioned above. In some situations, the task involves flowing signal $S_1$ to secondary controller 17. Signal $S_1$ can be flowed to secondary controller 17 in many different ways, such as by establishing wireless link 95*a*. In this embodiment, signal $S_1$ is flowed to secondary controller 17 through conductive lines 32*a* and 32*b*.

In response to signal $S_1$, secondary controller 17 performs one or more tasks. In one task, controller 17 controls the operation of electrical load 16. For example, controller 17 can control the operation of electrical load 16 by turning it on and/or off as desired. In some examples, controller 17 can turn electrical load 16 on and/or off by activating and deactivating a switch (not shown) coupled to electrical load 16.

In another task, controller 17 determines the performance parameters of electrical load 16. The performance parameters can include, among others, the temperature of operation, power consumption, power consumption as a function of time, voltage, current, power factor and/or frequency of operation of electrical load 16. Performance parameters, such as the power factor and power consumption are typically determined by secondary controller 17 using the current and voltage of device 16, but in other examples, they can be determined by primary controller 12. An advantage of having secondary controller 17 determine these performance parameters is that they will be more up-to-date in case electrical load 16 fails, and can provide a better indication of the operation of device 16 before it fails. Having more up-to-date information is useful for troubleshooting device 16 to determine its reason for failure.

If desired, controller 17 flows information regarding electrical load 16 to primary controller 12 through communication link 32. Further, primary controller 12 flows the information regarding electrical load 16 to terminal device 18 through data cable 113*a*.

Figure 5I:
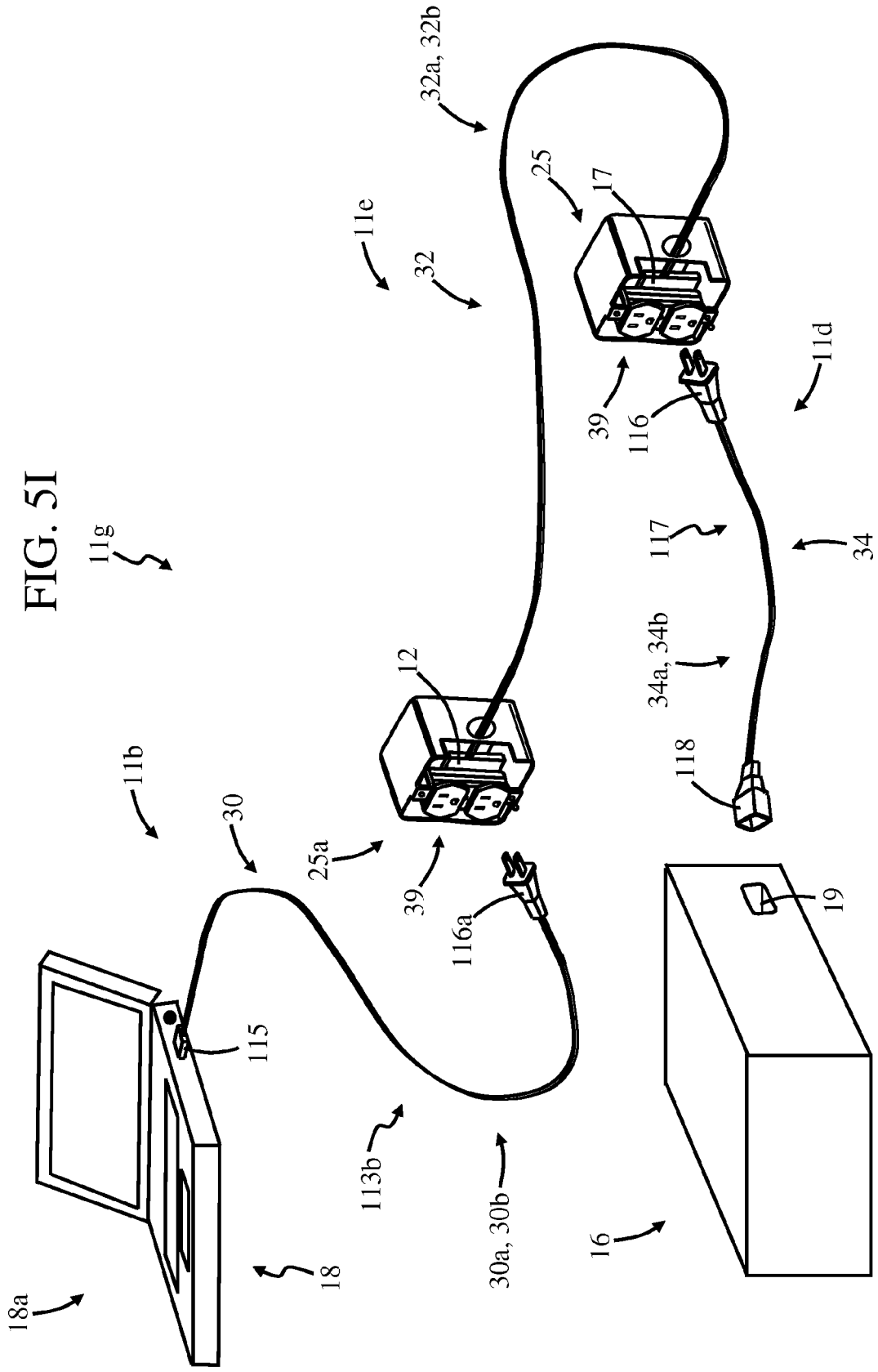

FIG. 5I is a perspective view of a system 11*g*. In this embodiment, system 11*g* includes systems 11*b*, 11*d* and 11*e*, which are discussed in more detail above with FIGS. 5D, 5F and 5G, respectively. In this embodiment, terminal device 18 is in communication with electrical outlet 25*a* through data cable 113*b* in a manner described in more detail above with FIG. 5D. Further, electrical outlets 25 and 25*a* are in communication with each other in a manner described in more detail above with FIG. 5G. Electrical load 16 is in communication with electrical outlet 25 in a manner described in more detail above with FIG. 5F.

In operation, terminal device 18 flows control signal $S_{Control}$ to primary controller 12 through data cable 113*a*. In response to signal $S_{Control}$, primary controller 12 performs one or more tasks, such as those mentioned above. In some situations, the task involves flowing signal $S_1$ to secondary controller 17. Signal $S_1$ can be flowed to secondary controller 17 in many different ways, such as by establishing wireless link 95*a*. In this embodiment, signal $S_1$ is flowed to secondary controller 17 through conductive lines 32*a* and 32*b*.

In response to signal $S_1$, secondary controller 17 performs one or more tasks, as discussed in more detail above with FIG. 5H. If desired, controller 17 flows information regarding electrical load 16 to primary controller 12 through communication link 32. Further, primary controller 12 flows the information regarding electrical load 16 to terminal device 18 through data cable 113*a*.

Figure 5J:
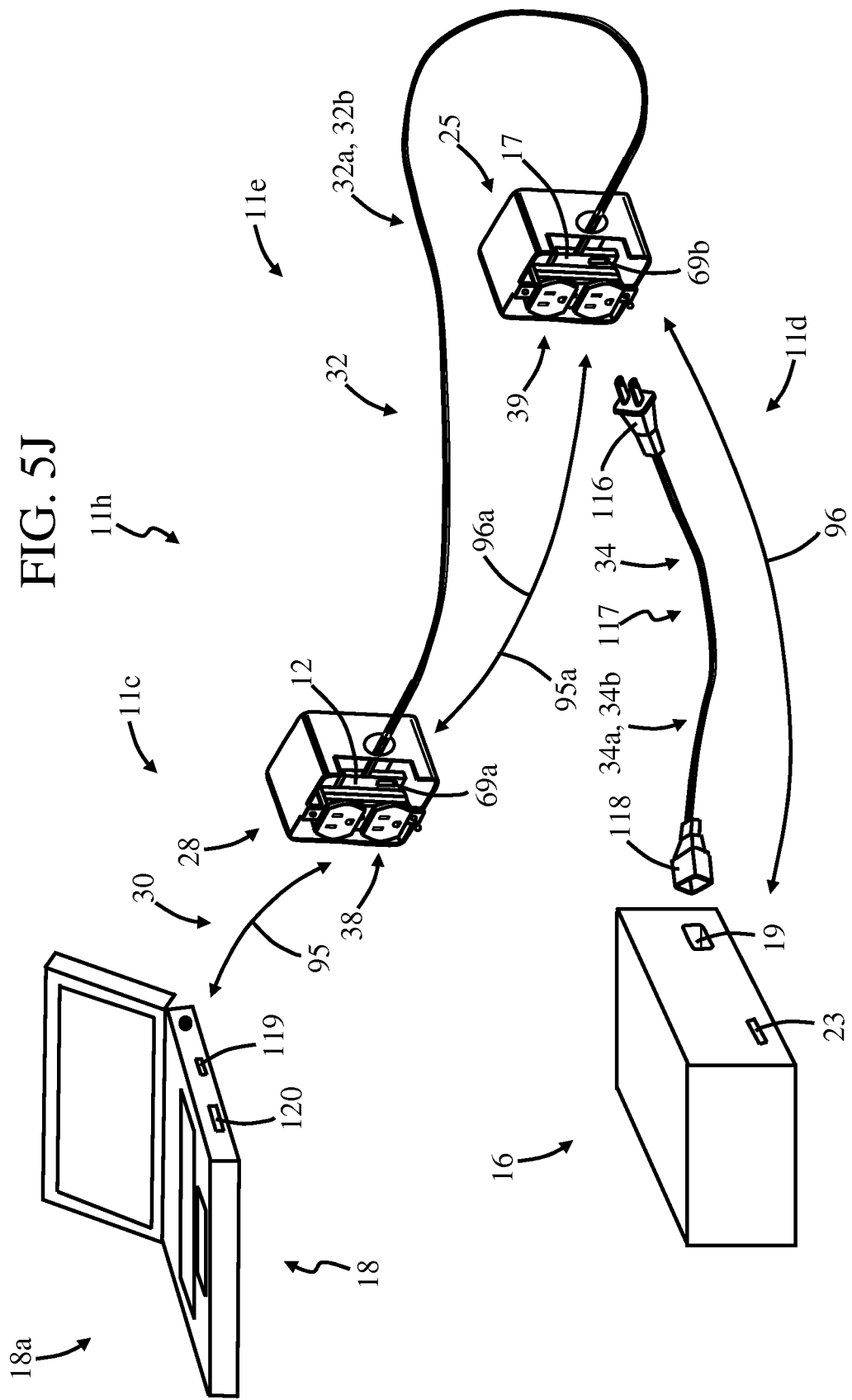

FIG. 5J is a perspective view of a system 11*h*. In this embodiment, system 11*h* includes systems 11*c*, 11*d* and 11*e*, which are discussed in more detail above with FIGS. 5E, 5F and 5G, respectively. In this embodiment, communication channel 30 is established between terminal device 18 and electrical outlet 28. Communication channel 30 can be established in many different ways, such as those described in more detail above. In this embodiment, communication channel 30 is established in response to establishing wireless link 95 in a manner described in more detail above with FIG. 5E.

In this embodiment, communication channel 32 is established between electrical outlets 25 and 28. Communication channel 32 can be established in many different ways, such as those described in more detail above with FIG. 5G. In some embodiments, communication channel 32 is established in response to establishing wireless links 95*a* and 96*a*. In some embodiments, communication channel 32 is established through conductive lines 32*a* and 32*b*. It should be noted that communication channel 32 can be established through wireless links 95*a* and 96*a*, as well as through conductive lines 32*a* and 32*b*, if desired.

In this embodiment, communication channel 34 is established between electrical load 16 and electrical outlet 25. Communication channel 34 can be established in many different ways, such as those described in more detail above with FIG. 5F. In some embodiments, communication channel 34 is established in response to establishing wireless link 96. In some embodiments, communication channel 34 is established through conductive lines 34*a* and 34*b*. It should be noted that communication channel 34 can be established through wireless link 96, as well as through conductive lines 34*a* and 34*b*, if desired.

Figure 6:
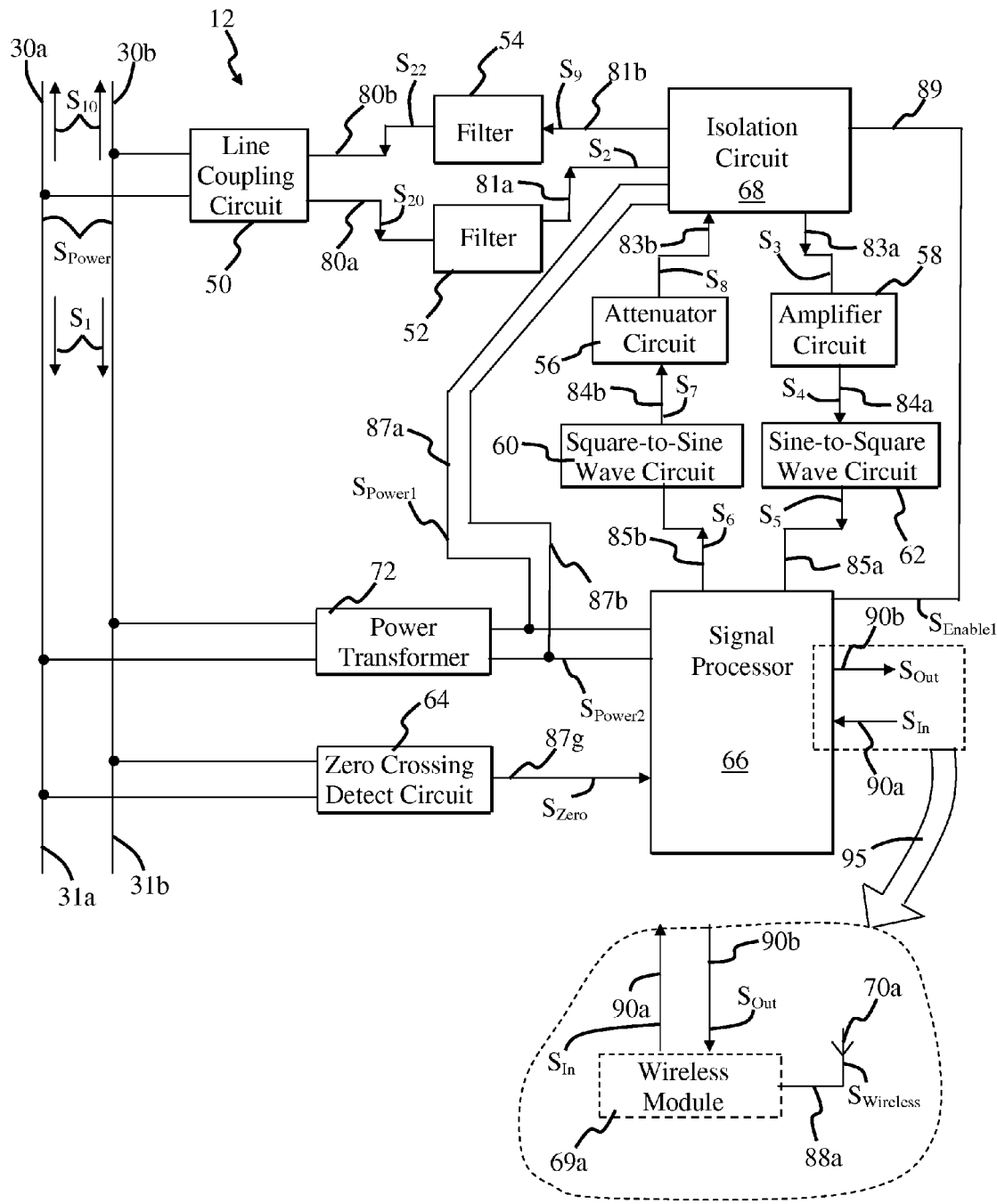
FIG. 6 is a block diagram of one embodiment of the primary controller of the system of FIGS. 4A and 4B.

FIG. 6 is a block diagram of primary controller 12 of the systems of FIGS. 4A and 4B. It should be noted that the primary controllers shown in FIGS. 1 and 2 and 3A and 3B can be the same or similar to the controller shown in FIG. 6. Primary controller 12 includes an AC AC line coupling circuit 50 which has separate inputs coupled to lines 30*a* and 30*b* (FIGS. 4A and 4B). It should be noted that conductive lines 30*a* and 30*b* are coupled to conductive lines 31*a* and 31*b*, respectively. An output of circuit 50 is coupled to a filter 52 through a conductive line 80*a* and an output of filter 52 is coupled to an input of an isolation circuit 68 through a conductive line 81*a*. An output of isolation circuit 68 is coupled to an input of an amplifier circuit 58 through a conductive line 83*a* and an output of amplifier circuit 58 is coupled to an input of a sine-to-square wave circuit 62 through a conductive line 84*a*. An output of sine-to-square wave circuit 62 is coupled to an input of a signal processor 66.

An output of processor 66 is coupled to an input of a square-to-sine wave circuit 60 through a conductive line 85*b* and an output of circuit 60 is coupled to an input of an attenuator circuit 56 through a conductive line 84*b*. An output of attenuator circuit 56 is coupled to isolation circuit 68 through a conductive line 83*b* and an output of isolation circuit 68 is coupled to an input of a filter 54 through a conductive line 81*b* and an output of filter 54 is coupled to an input of AC line coupling circuit 50 through a conductive line 80*b*. Filters 52 and 54 are analog band-pass filters in this embodiment, but they could be other types of filters in other examples.

Conductive lines 31*a* and 31*b* are coupled to separate inputs of a zero crossing detect circuit 64. An output of circuit 64 is coupled to another input of processor 66 through a conductive line 87*g*. Conductive lines 32*a* and 32*b* are further coupled to separate inputs of a power transformer 72. Separate outputs of transformer 72 are coupled to conductive lines 87*a* and 87*b*. Conductive lines 87*a* and 87*b* are connected to processor 66 and isolation circuit 68 to provide power thereto in the form of signals $S_{Power1}$ and $S_{Power2}$, respectively. An enable terminal of processor 66 is connected to a conductive line 89 which extends between it and isolation circuit 68. Conductive line 89 flows a signal $S_{Enable1}$ between isolation circuit 68 and processor 66.

Signal processor 66 receives signals $S_{In}$ and transmits signal $S_{Out}$, which can be in signal $S_{Control}$ from terminal device 18, through separate terminals connected to conductive lines 90*a* and 90*b*, respectively. In some embodiments, signals $S_{In}$ and $S_{Out}$ can be transmitted and received through a wireless link, as indicated by substitution arrow 90. Here, conductive lines 90*a* and 90*b* (FIGS. 4A and 4B) are connected between separate terminals of processor 66 and a wireless module 69*a*. A conductive line 88 is connected between wireless module 69*a* and an antenna 70 so that signals can be transmitted therefrom wirelessly between processor 66 and terminal device 18. Wireless module 69*a* can be of many different types. In this example, it is a 2.4 GHz transceiver, but there are other wireless modules in the art that can be used. It should be noted that wireless module 69*a* can be positioned inside or outside of outlet housing 29 of FIG. 5A. The operation of primary controller 12 will be discussed in more detail below.

Figure 7:
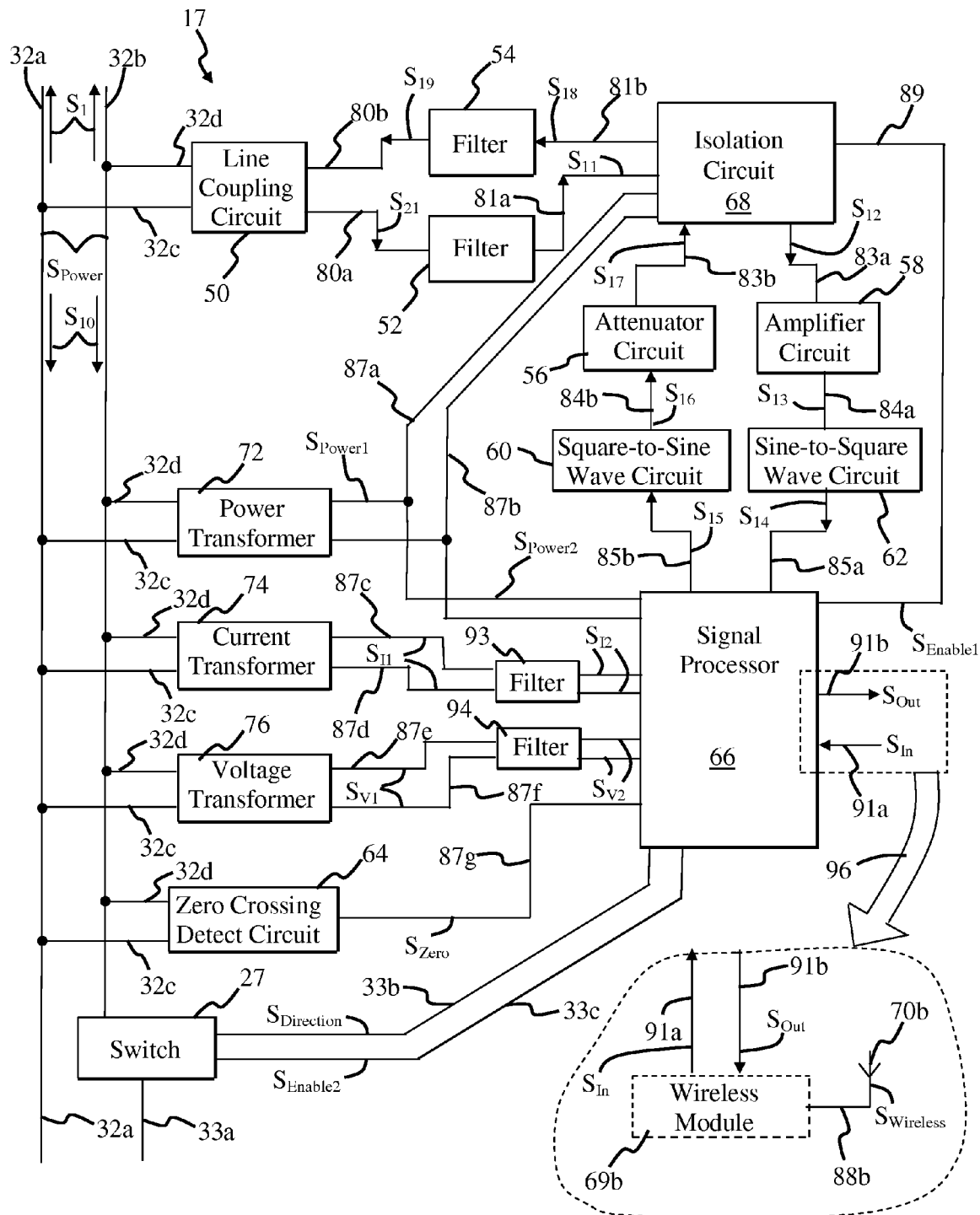
FIG. 7 is a block diagram of one embodiment of the secondary controller of the system of FIGS. 4A and 4B.

FIG. 7 is a block diagram of secondary controller 17 of the systems of FIGS. 4A and 4B. It should be noted that the secondary controllers shown in FIGS. 1 and 2 and 3A and 3B can be the same or similar to the controller shown in FIG. 7. In this embodiment, controller 17 is similar to primary controller 12 discussed above. However, controller 17 also includes a voltage transformer 76 and a current transformer 74, with each having separate inputs coupled to conductive lines 32a and 32b through conductive lines 32c and 32d, respectively. It should be noted that conductive lines 32a, 32b, 32c and 32d are also shown in FIGS. 4A and 4B. Separate outputs of transformer 74 are coupled to separate inputs of a filter 93 through conductive lines 87c and 87d. Separate outputs of transformer 76 are coupled to separate inputs of a filter 94 through conductive lines 87e and 87f. Outputs of filter 93 and 94 are coupled to separate inputs of processor 66. Filters 93 and 94 are analog low pass filters, but they can be other types of filters in other examples.

In this embodiment, switch 27 has an input coupled to line 32b and an output coupled to line 33a. Switch 27 also has separate terminals coupled to processor 66 through conductive lines 33b and 33c. Conductive lines 33b and 33c flow signals $S_{Direction}$ and $S_{Enable2}$, respectively, between processor 66 and switch 27. Signal processor 66 receives signals $S_{In}$ and $S_{Out}$ through separate terminals connected to conductive lines 91a and 91b, respectively. In some embodiments, signals $S_{In}$ and $S_{Out}$ can be transmitted and received through a wireless link, as indicated by substitution arrow 91, which is similar to that discussed above in conjunction with FIG. 6. Wireless module 69b of controller 17 can be used to receive a wireless signal from a sensor, which can be of many different types. For example, it can be a motion, temperature, pressure, and/or humidity sensor, among others. The sensor can be integrated with controller 17 and/or outlet 25 or it can be positioned outside of them. The operation of controller 17 is similar to that of primary controller 12 of FIG. 6, both of which will be discussed in more detail below. However, in this embodiment, controller 17 can determine the performance parameters of operation of electrical load 16.

Figure 8:
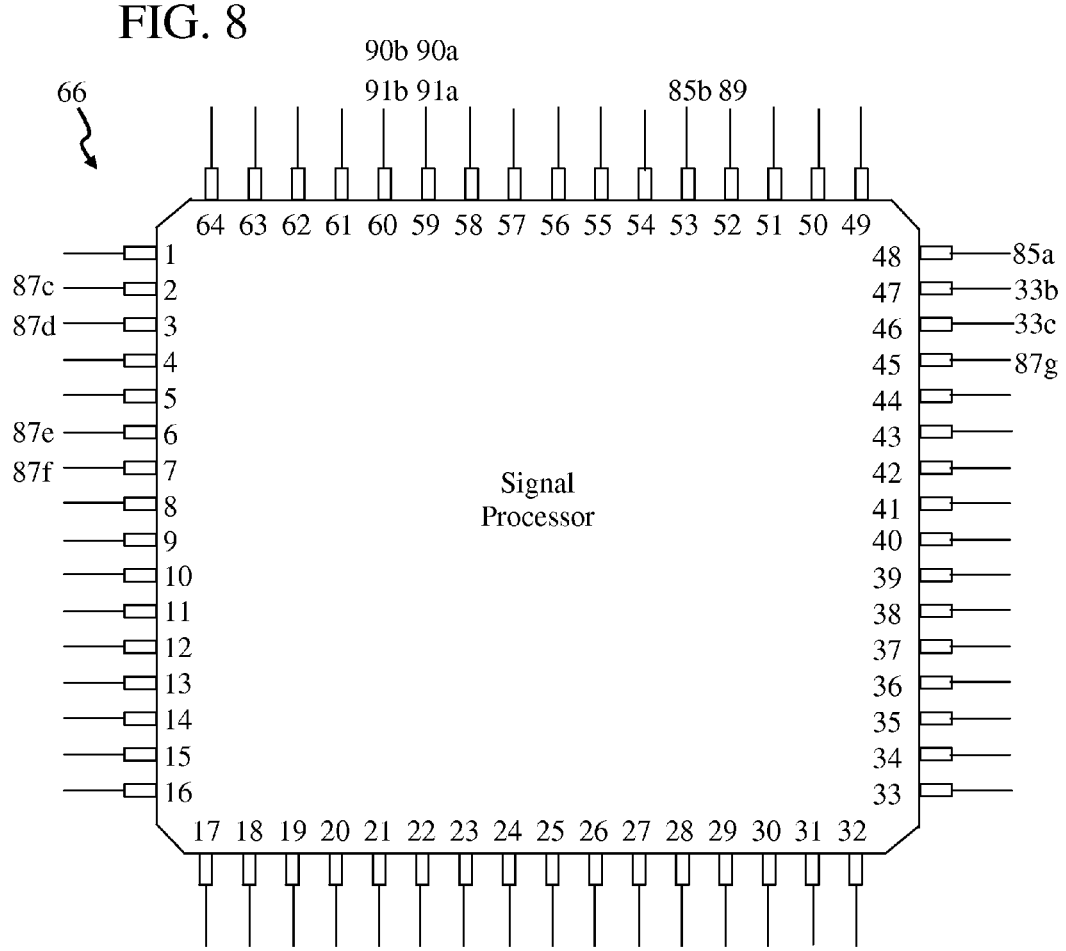
FIG. 8 is a top view of one embodiment of a digital signal processor of the primary and secondary controllers of FIGS. 6 and 7.

FIG. 8 is a block diagram of one embodiment of signal processor 66 of primary and secondary controllers 12 and 17 of FIGS. 6 and 7, respectively. In this embodiment, signal processor 66 includes a Texas Instruments MSP430FE42x Mixed Signal Microcontroller. It should be noted that the TI MSP430FE42x Mixed Signal Microcontroller can be replaced with a similar circuit made by TI or another supplier. Hence, the use of the TI MSP430FE42x chip in this embodiment is for illustrative purposes only.

For primary controller 12, pin 45 is connected to conductive line 87g and pins 48 and 53 are connected to conductive lines 85a and 85b, respectively. Further, pins 59 and 60 are connected to conductive lines 90a and 90b, respectively (FIG. 6). Controller 17 is connected similarly, only pins 59 and 60 are connected to conductive lines 91a and 91b, respectively (FIG. 7). Further, pins 2 and 3 are connected to conductive lines 87c and 87d, respectively, and pins 6 and 7 are connected to conductive lines 87e and 87f, respectively. Further, pins 46 and 47 are connected to conductive lines 33c and 33b, respectively.

Figure 9:
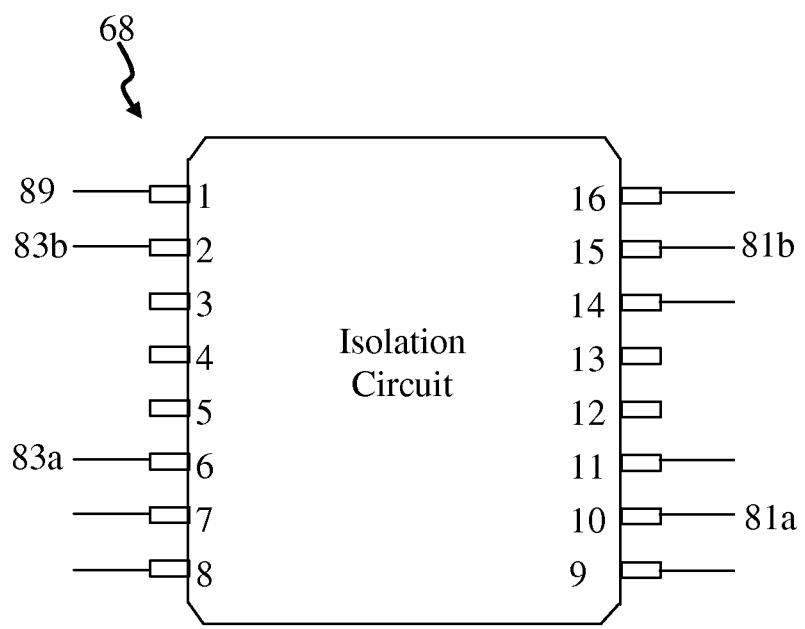
FIG. 9 is a top view of one embodiment of an isolation circuit of the primary and secondary controllers of FIGS. 6 and 7.

FIG. 9 is a block diagram of one embodiment of isolation circuit 68 of primary and secondary controllers 12 and 17 of FIGS. 6 and 7, respectively. In this embodiment, isolation circuit 68 includes an Agilent HCPL-800J PLC Powerline DAA Integrated Circuit (IC). It should be noted that the Agilent HCPL-800J PLC Powerline DAA IC can be replaced with a similar circuit which provides isolation between transmission and amplifier lines as desired in most power line modem applications. Hence, the use of the HCPL-800J chip in this embodiment is for illustrative purposes only.

Isolation circuit 68 provides optical coupling between conductive lines 81a and 81b and conductive lines 83a and 83b. Optical coupling technology provides very high isolation mode rejection, and a high isolation mode rejection provides improved electromagnetic interference (EMI) and electromagnetic compatibility (EMC) performance. Application robustness is enhanced by the inherent properties of opto-isolation devices to reduce the flow of damaging surge transients from signal $S_{Power}$. Transmitter performance is enhanced with the use of a high efficiency, low distortion line driver stage. Transmitter robustness is further enhanced with integrated load detection and over-temperature protection functions.

In this particular example, isolation circuit 68 includes 16 pins. Pin 1 is connected to line 89 and pin 2 is connected to lines 83b so that it is coupled to the output of attenuator circuit 56. Pin 6 is connected to line 83a so that it is coupled to the input of amplifier circuit 58 and pin 15 is connected to line 81b so that it is coupled to the input of filter 54. Pin 10 is connected to line 81a so that it is coupled to the input of filter 52 and pin 7 is connected to a voltage power source, which can be through lines 87a and/or 87b so that it is coupled to power transformer 72. transformer 72. Pin 8 is coupled to a reference potential $V_{Ref1}$ so that the potential difference between pins 7 and 8 provide power to circuit 68. Further, pin 9 is coupled to a reference resistor $R_{Ref}$ to set a line driving biasing current. Resistor $R_{Ref}$ typically has a value of 24 kΩ, although it can have other values. Pin 11 is coupled to a reference capacitor $C_{Ref}$ to provide a desired stability to circuit 68. Pin 14 is coupled to a voltage power source $V_{cc2}$, which can be lines 87a and/or 87b so that it is coupled to power transformer 72. Pin 16 is coupled to a reference potential $V_{Ref2}$ so that the potential difference between pins 14 and 16 provide power to circuit 68. It should be noted that reference potentials $V_{Ref1}$ and/or $V_{Ref2}$ can be analog and/or digital current returns. More information about the MSP430FE42x and HCPL-800J chips can be found in their corresponding product data sheets which are incorporated herein by reference, as though fully set forth herein.

In operation, power transformer 72 in primary and secondary controllers 12 and 17 receives signal $S_{po}$ on lines 32a and 32b, onto which signals $S_1$ or $S_{10}$ are superimposed. In response, transformer 72 outputs signals $S_{Power1}$ and $S_{Power2}$ on lines 87a and 87b, respectively. Since signal $S_{Power}$ is a high voltage, transformer 72 transforms this high voltage into a lower voltage which can be used to provide power to signal processor 66, isolation circuit 68, and or switch 27. In one example, signal $S_{Power}$ has a peak-to-peak amplitude of 120 V and oscillates at 60 Hertz and signals $S_1$ and $S_{10}$ have amplitudes and 4 V and oscillate at 120 kiloHertz (kHz). Transformer 72 transforms this 120 V power signal into $S_{Power1}$ and $S_{Power2}$ so that they have amplitudes between about 2 V and 5 V, although they can have amplitudes outside of this range. The particular signal amplitude will depend on the power needed for signal processor 66, isolation circuit 68, and or switch 27. For example, if switch 27 is a bi-stable magnetic relay, then it is typically powered by about 24 V.

In controller 17, current transformer 74 receives signal $S_{Power}$ on lines 32a and 32b and outputs signal $S_{I1}$ between lines 87c and 87d. Signal $S_{I1}$ corresponds to the current of signal $S_{Power}$ which corresponds to the current of electrical load 16. Signal $S_{I1}$ is filtered by filter 93 and provided to processor 66 as filtered signal $S_{I2}$. Similarly, voltage transformer 76 receives signals $S_{Power}$ on lines 32a and 32b and outputs signal $S_{V1}$ between lines 87e and 87f. Signal $S_{V1}$ corresponds to the voltage of signal of $S_{Power}$ which corresponds to the voltage of electrical load 16. Signal $S_{V1}$ is filtered by filter 94 and provided to processor 66 as filtered signal $S_{V2}$.

The operation of systems 40 and 41 using primary and secondary controllers 12 and 17 or FIGS. 6 and 7, respectively, will now be discussed in more detail. In FIG. 6, processor 66 receives signal $S_{In}$ on line 31a from terminal device 18 by connecting line 31a to device 18 or by using wireless modules 69b and/or 69b. In response, processor 66 codes and transmits it as signal $S_6$ to square-to-sine wave circuit 60 on line 85b so that $S_6$ is a coded version of $S_{In}$. It will be discussed in more detail in conjunction with FIGS. 10A-10K how processor 66 codes and decodes some of the signals, such as $S_{In}$, $S_{Out}$, $S_{I2}$ and $S_{V2}$, it transmits and receives. Circuit 60 converts the square wave signal $S_6$ to a sine wave signal and provides it to line 84b as signal $S_7$.

Signal $S_7$ is attenuated by attenuator circuit 56 and provided to line 83b as signal $S_8$. Signal $S_8$ is provided to line 81b as signal $S_9$ by isolation circuit 68 when it is enabled. Isolation circuit 68 is enabled at a desired time in response to $S_{Zero}$ and $S_{Enable1}$. In some embodiments, the desired time is when $S_{Power}$ is near its zero value. In one embodiment, signal $S_{Power}$ is near its zero value when it is within plus or minus a time $T_{Zero}$ from its zero value. However, different times can be used in other embodiments. Signal $S_9$ is filtered by filter 54 and provided to line 80b as signal $S_{22}$. Signal $S_{22}$ is coupled to lines 32a and 32b by line coupling circuit 50 as signal $S_{10}$ so that the signal between lines 32a and 32b includes signals $S_{Power}$ and $S_{10}$. Signal $S_{10}$ then flows to secondary controller 17, as shown in FIG. 7.

In FIG. 7, signals $S_{Power}$ and $S_{10}$ are received by controller 17. Line coupling circuit 50 separates signal $S_{10}$ from $S_{Power}$ and provides it to line 80a as signal $S_{21}$. Filter 52 filters signal $S_{21}$ and provides it to line 81a as signal $S_{11}$. In response to $S_{Zero}$, processor 66 enables isolation circuit 68 through signal $S_{Enable1}$ in a manner similar to that discussed above. In response to $S_{Enable1}$, isolation circuit 68 allows signal $S_{11}$ to pass from line 81a to line 83a as signal $S_{12}$. Signal $S_{12}$ is amplified by amplifier circuit 58 and provided to line 84a as signal $S_{13}$. In this example, signal $S_{13}$ is a sine wave that is converted to a square wave by sine-to-square-wave circuit 62 and provided as signal $S_{14}$ to line 85a. Signal $S_{14}$ is received by processor 66 where it is processed. This involves having processor 66 determine the control and/or monitoring information in signal $S_{14}$, which corresponds to the control and/or monitoring information in signal $S_{In}$ on line 31a of FIG. 6.

In response to the control and/or monitoring information in signal $S_{14}$, processor 66 can perform several different tasks. In one example, processor 66 determines the performance parameters of electronic device 16. It does this by receiving signals $S_{I2}$ and $S_{V2}$ from filters 93 and 94, respectively. Signals $S_{I2}$ and $S_{V2}$ include information about the voltage and current of electronic device 16. Processor 66 can use signals $S_{I2}$ and $S_{V2}$ to determine other performance parameters of device 16, such as its power consumption, power consumption as a function of time, power factor, frequency, etc. The control signal can include information so that processor 66 flows signals $S_{Direction}$ and $S_{Enable2}$ to switch 27 to open or close it as desired.

The desired performance parameters of device 16 are coded by processor 66 in a manner that will be described in more detail below in conjunction with FIGS. 10A-10O and this coded signal is provided to line 85b as signal $S_{15}$. Circuit 60 converts the square wave signal $S_{15}$ to a sine wave signal and provides it to line 84b as signal $S_{16}$. Signal $S_{16}$ is attenuated by attenuator circuit 56 and provided to line 83b as signal $S_{17}$. Signal $S_{17}$ is provided to line 81b as signal $S_{18}$ by isolation circuit 68 when it is enabled in a manner similar to that discussed above. Signal $S_{18}$ is filtered by filter 54 and provided to line 80b as signal $S_{19}$. Signal $S_{19}$ is coupled to lines 32a and 32b by line coupling circuit 50 as signal $S_1$ so that the signal between lines 32a and 32b includes signals $S_{Power}$ and $S_1$. Signal $S_1$ then flows to primary controller 12, as shown in FIG. 6.

In FIG. 6, signals $S_{Power}$ and $S_1$ are received by primary controller 12. Line coupling circuit 50 separates signal $S_1$ from $S_{Power}$ and provides it to line 80a. Filter 52 filters signal $S_1$ and provides it to line 81a as signal $S_2$. In response to $S_{Zero}$, processor 66 enables isolation circuit 68 through signal $S_{Enable1}$ in a manner similar to that discussed above. In response to $S_{Enable1}$, isolation circuit 68 allows signal $S_2$ to pass from line 81a to line 83a as signal $S_3$. Signal $S_3$ is amplified by amplifier circuit 58 and provided to line 84a as signal $S_4$. Signal $S_4$ is a sine wave that is converted to a square wave by sine-to-square-wave circuit 62 and provided as signal $S_5$ to line 85a. Signal $S_5$ is received by processor 66 where it is decoded in a manner described in more detail below. The decoded signal is then sent to terminal device 18 as signal $S_{Out}$ on line 31b. Signal $S_{Out}$ can flow to terminal device 18 on line 31b or it can be sent using wireless module 69a. After this, the process can repeat itself if desired.

In this embodiment, signals $S_5$, $S_6$, $S_{14}$, and $S_{15}$ are square wave signals and the others are sinusoidal. Signals $S_5$, $S_6$, $S_{14}$, and $S_{15}$ are square wave signals because they are processed by digital circuitry and the other signals are sinusoidal because it is generally more efficient to flow sinusoidal signals through conductive lines. It should be noted, however, that these signals can have other shapes, such as triangular. For the triangular wave example, circuit 60 is replaced with a square-to-triangle wave circuit and circuit 62 is replaced with a triangle-to-square wave circuit.

Figure 10A:
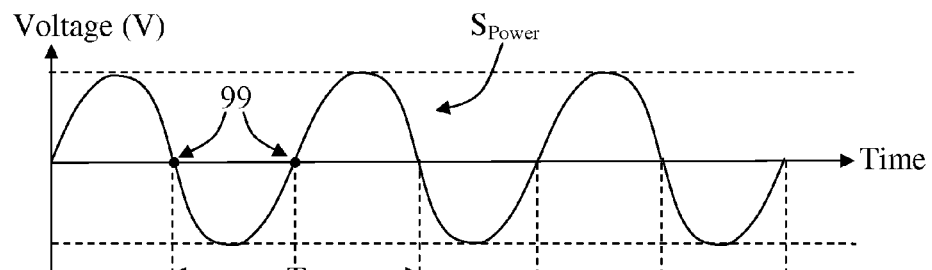
FIGS. 10A-10O are graphs of the various signals shown in the primary and secondary controllers of FIGS. 6 and 7.
Figure 10B:
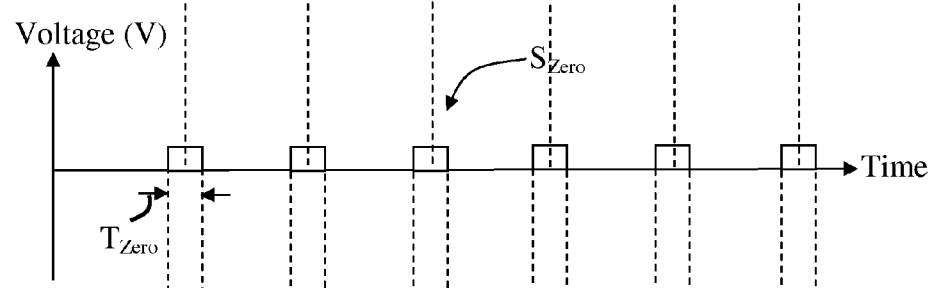
Figure 10C:
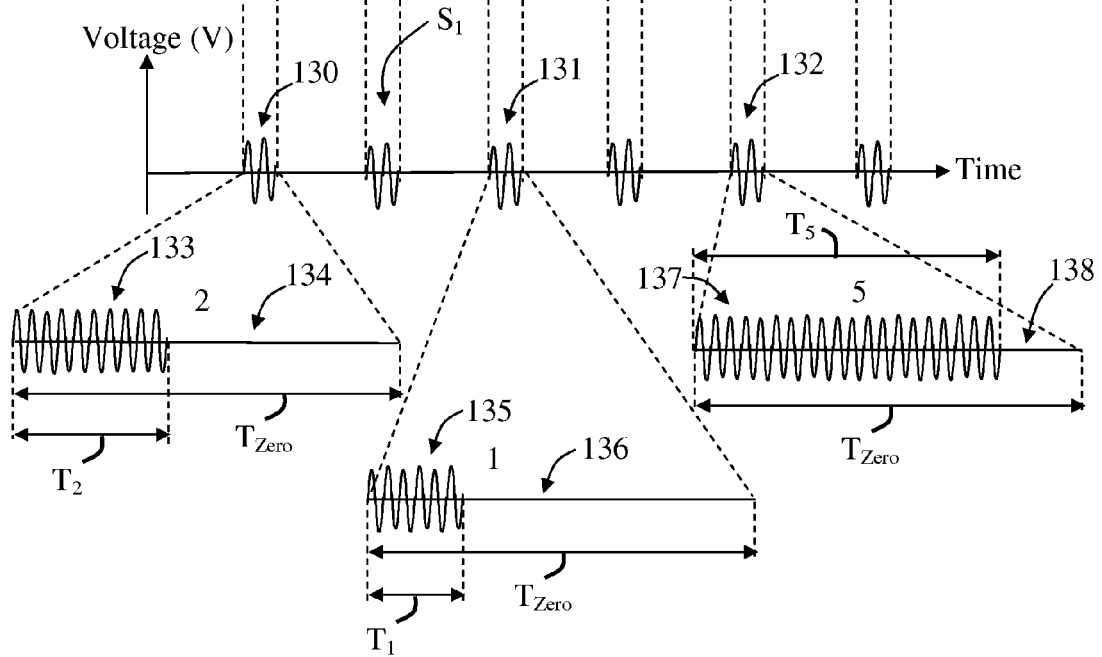
Figure 10H:
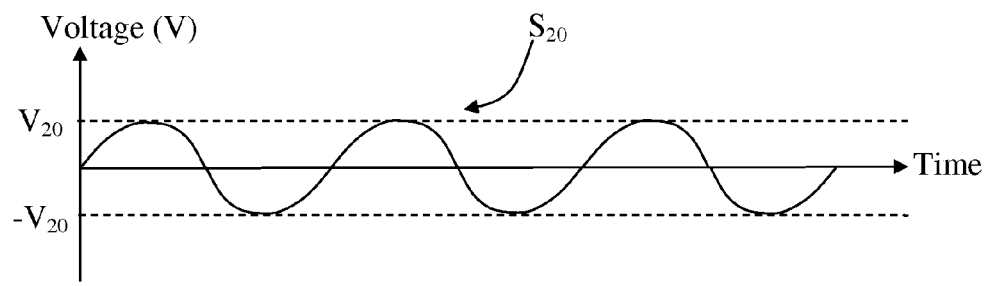
Figure 10I:
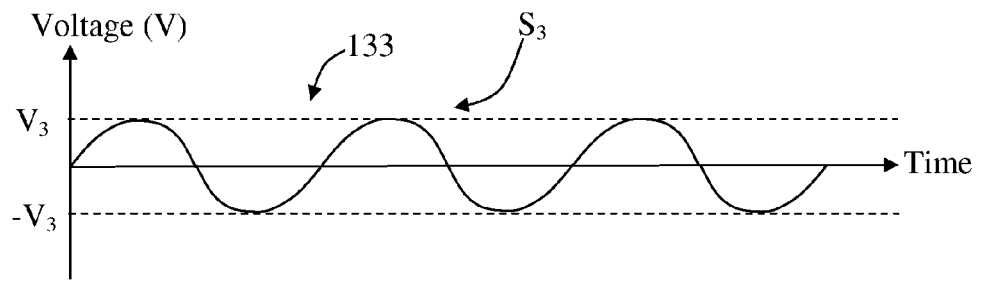
Figure 10J:
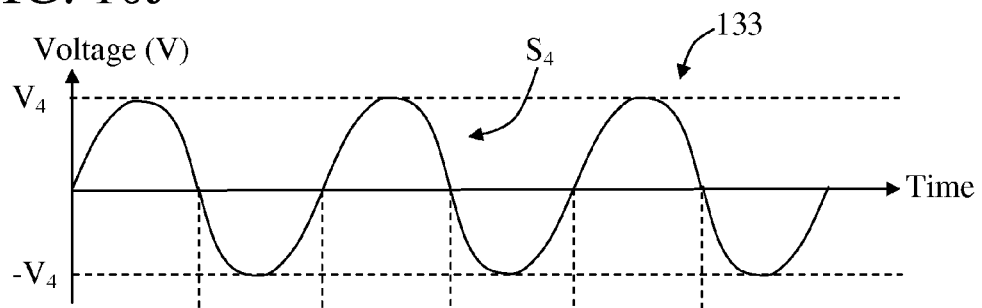
Figure 10K:
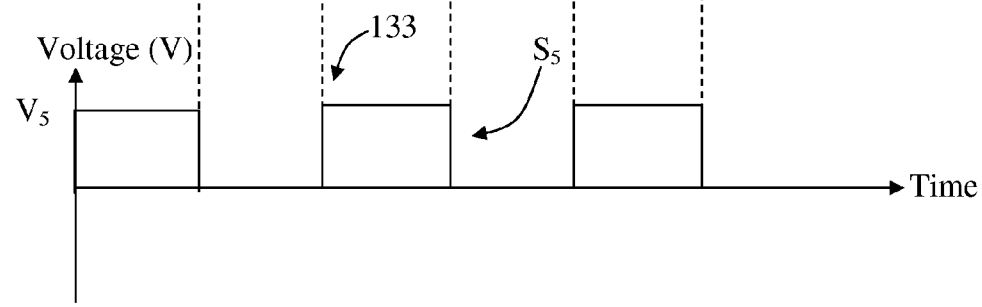
Figure 10L:
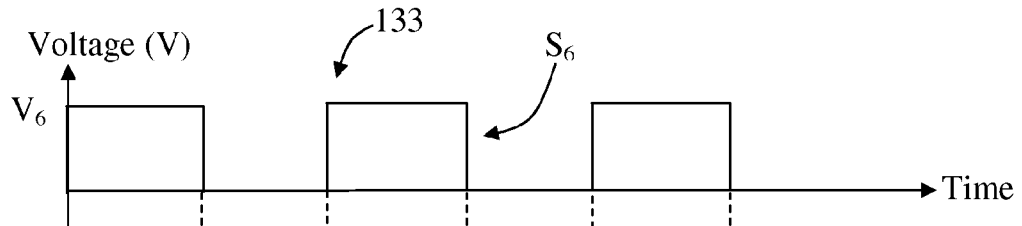
Figure 10M:
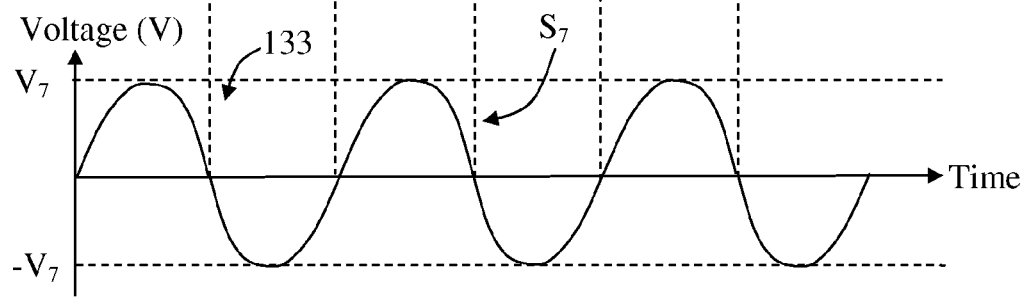
Figure 10N:
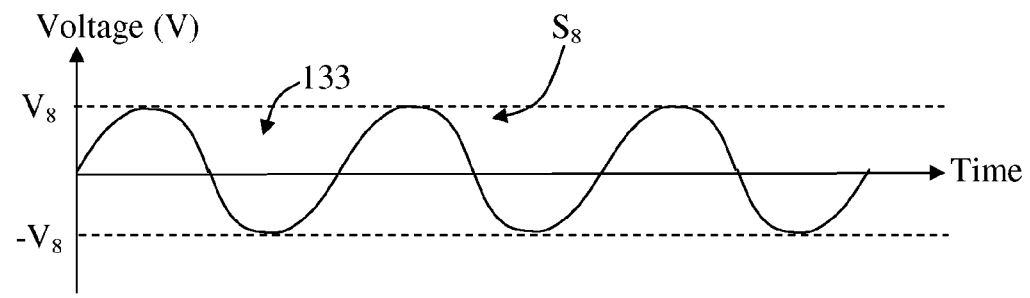
Figure 10O:
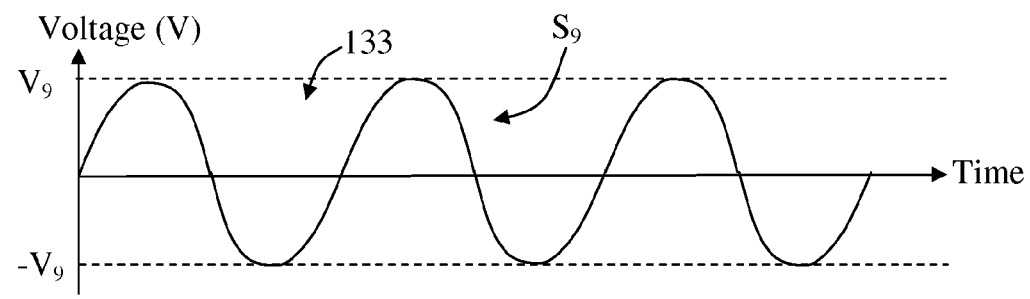

FIGS. 10A-10O are graphs of signals in primary controller 12 and/or secondary controller 17 as a function of time. FIGS. 10A-10O are shown to better illustrate the operation of primary and secondary controllers 12 and 17 of FIGS. 6 and 7, respectively, and to show how processor 66 codes and decodes the various signals it transmits and receives.

FIG. 10A shows signal $S_{Power}$ which is sinusoidal and oscillates at a particular frequency. In this example, $S_{Power}$ is a 120 V peak-to-peak AC signal that oscillates at 60 Hz so that its period T is about 16.6 milliseconds (ms) and half of its period (T/2) is about 8.3 ms.

FIG. 10B shows signal $S_{Zero}$ which is a square wave with each pulse having a width of $T_{Zero}$. Signal $S_{Zero}$ is provided in response to an indication that signal $S_{Power}$ is zero or near zero. In this example, signal $S_{Power}$ is near zero when its amplitude is within plus or minus $T_{Zero}$ of its inflection point 99 (See FIG. 10A). However, in other examples, $S_{Power}$ can be defined as being near zero when it is within another predetermined time of inflection point 99.

FIG. 10C shows one example of signal $S_1$. Signal $S_1$ can have many different shapes depending on the information it is carrying. In general, signal $S_1$ is a train of oscillating signals which are separated from each other by one-half the period (T) of signal $S_{Power}$, denoted as T/2 (See FIG. 10A). In general, signal $S_1$ is sinusoidal with a frequency $f_{carrier}$ for a portion of time within time $T_{Zero}$ and zero or constant for another portion of time $T_{Zero}$. In this example, signal $S_1$ is zero outside of $T_{Zero}$, although in some examples, it can have a constant non-zero value. It should be noted that signal $S_1$ is shown here as being sinusoidal, but it can have other shapes which oscillate a predetermined number of times within time $T_{Zero}$.

Frequency $f_{carrier}$ can have many different values. In general, frequency $f_{carrier}$ has a value between 30 Hertz (30 Hz) to 300,000,000,000 Hertz (300 GHz). The value of frequency $f_{carrier}$ depends on many different factors, such as the amount of data it is desired to flow as a function of time. In general, the flow of data as a function of time increases in response to increasing the value of frequency $f_{carrier}$. Further, the flow of data as a function of time decreases in response to decreasing the value of frequency $f_{carrier}$. In this way, the flow of data as a function of time is adjustable in response to adjusting the value of frequency $f_{carrier}$. For example, the flow of data is in a range between about 2,000,000 bits per second (2 Mbits/S) and 72,000,000 bits per second (72 Mbits/S) when frequency $f_{carrier}$ is driven to 1,000,000 Hz (1 MHz).

It should be noted that the range of values of frequency $f_{carrier}$ depends on the bit error loss, as well as the number of coded symbols. The coded symbols will be discussed in more detail below. In general, the number of coded symbols is reduced to reduce the bit error loss in response to increasing the value of frequency $f_{carrier}$. Further, the number of coded symbols is increased to increase the bit error loss in response to increasing the value of frequency $f_{carrier}$. The bit error loss, at a given value of frequency $f_{carrier}$, is reduced in response to reducing the number of coded symbols used. Further, the bit error loss, at the given value of frequency $f_{carrier}$, is increased in response to increasing the number of coded symbols used. Adjusting the value of frequency $f_{carrier}$ is desirable to adjust the amount of power consumed.

In general, the amount of power consumed increases and decreases in response to increasing and decreasing, respectively, the value of frequency $f_{carrier}$. Further, a data compression rate is adjustable in response to adjusting the number of coded symbols, as well as the value of frequency $f_{carrier}$. In general, the data compression rate is increased and decreased in response to increasing and decreasing, respectively, the number of symbols. The data compression rate can be characterized in many different ways, such as by the ratio of the compressed size of the data to the uncompressed size of the data.

The amount of data flowed can be adjusted in response to adjusting the number of carrier frequencies. In general, the number of carrier frequencies is 1, 2, 3, . . . , N, wherein N is a whole number. As the number N of carrier frequencies increases and decreases, the amount of data flowed increases and decreases. The value of the carrier frequencies is typically chosen to be within a desired bandwidth, $f_{Band}$. In some embodiments, two carrier frequencies $f_{carrier1}$ and $f_{carriers2}$ are used so that N=2. In one example, the frequency bandwidth $f_{Band}$ is between 1,000,000 Hertz (1 MHz) and 5,000,000 Hertz (5 MHz), and frequency $f_{carrier1}$ is 1,500,000 Hertz (1.5 MHz) and frequency $f_{carrier2}$ is 3,500,000 Hertz (3.5 MHz). In another embodiment, the frequency bandwidth $f_{Band}$ is between 1,000,000 Hertz (1 MHz) and 5,000,000 Hertz (5 MHz), and three carrier frequencies $f_{carrier1}$, $f_{carrier2}$ and $f_{carriers3}$ are used so that N=3. In one example, frequency $f_{carrier1}$ is 2,250,000 Hertz (2.25 MHz), frequency $f_{carrier2}$ is 2,300,000 Hertz (2.3 MHz) and frequency $f_{carrier2}$ is 2,350,000 Hertz (2.35 MHz). It should be noted that the amount of data flows is less when N=2 than when N=3. Further, the amount of data flowed is greater when N=3 than when N=2.

FIGS. 10D-10G show examples of signal $S_1$ with different shapes. In FIG. 10D, signal $S_1$ is sinusoidal, but has an offset voltage $V_{Offset}$ and in FIG. 10E, signal $S_1$ is triangular in shape. In FIG. 10F, signal $S_1$ has a square shape and in FIG. 10G, signal $S_1$ includes pulses. It should be noted that signal $S_1$ can have other shapes, but only a few are shown here for simplicity.

In FIG. 10C, frequency $f_{Carrier}$ is 120 kHz and $T_{Zero}$ is 1.2 ms so that there are about 144 oscillations of $S_1$ within $T_{Zero}$ (1/120 kHz=8.3 microseconds (μs), 1.2 ms/8.3 μs=144) if $S_1$ oscillates throughout time $T_{Zero}$. It should be noted, however, that the carrier frequency and $T_{Zero}$ can have other values. For example, if the carrier frequency is 150 kHz and $T_{Zero}$ is 1.3 ms, then there are about 194 oscillations of $S_1$ within $T_{Zero}$ (1/150 kHz=6.7 (μs), 1.3 ms/6.7 μs=194).

As will be discussed in more detail presently, the portions of $S_1$ that are sinusoidal, zero, or constant depends on the information coded in $S_1$. For example, if it is desired to code the numbers zero (0) to nine (9) along with the letters of the English alphabet (i.e. A, B, C, . . . , X, Y, Z), then 36 different codes are needed to distinguish between these symbols. This is because at least 10 different codes are needed to distinguish between the numbers zero through nine and at least 26 different codes are needed to distinguish between the letters of the English alphabet. It should be noted that the letters of the English alphabet can be upper case and lower case, and combinations thereof. It should also be noted that the number of codes will depend on many other factors, such as the language used (English, French, Spanish, etc.), the number of symbols used (zero to nine, A, B, C, . . . , X, Y, Z, a, b, c, . . . , x, y, z, and +, −, =, or any of the other ASCI characters). The number of codes can even depend on the number base used to represent the numbers. For example, the numbers can be one or zero for binary (base 2), zero to seven for octal (base 8), zero to nine for decimal (base 10), and zero to F for hexadecimal (base 16), among others. The number of codes can also depend on the acceptable error in coded and decoding the symbols as will be discussed in more detail below.

In this particular example, the codes are distinguished from one another by the number of cycles that occur in time $T_{Zero}$, wherein a cycle corresponds to the period of the signal. This is shown in Table 1 which lists the number of cycles and the corresponding assigned symbol. For example, signal 130 in FIG. 10C is sinusoidal with 10 cycles in time $T_{Zero}$ in a region 133 and zero cycles in a region 134. From Table 1, signal 130 is assigned a symbol of '2' (two) since a number of cycles between 8 and 11 is coded as '2'. Similarly, signal 131 in FIG. 10C is sinusoidal with 6 cycles in time $T_{Zero}$ in a region 135 and zero cycles in a region 136. From Table From Table 1, signal 131 is assigned a symbol of '1' (one) since a number of cycles between 4 and 7 is coded as '1'. Likewise, signal 132 in FIG. 10C is sinusoidal with 20 cycles in time $T_{Zero}$ in a region 137 and zero cycles in a region 138. From Table 1, signal 132 is assigned a symbol of '5' (five) since a number of cycles between 19 and 21 is coded as '5'. If the signal has no cycles or is constant, zero or otherwise, during time $T_{Zero}$, then the signal is assigned a symbol of '0' (zero). If the signal is sinusoidal throughout time $T_{Zero}$ so that it has 144 cycles, then it is coded as a symbol 'Z'. It should be noted that the values and symbols in Table 1 can be programmed into a memory chip (not shown). The memory chip can be non-volatile or random access memory in some examples. The values and symbols in Table 1 can even be determined from a look-up table.

TABLE 1

| | Number of cycles | Percentage (%) | Value of Data |
|---|---|---|---|
| $T_0$ | 0 to 3 | 0.0 to 2.1 | 0 |
| $T_1$ | 4 to 7 | 2.8 to 4.9 | 1 |
| $T_2$ | 8 to 11 | 5.6 to 7.6 | 2 |
| $T_3$ | 12 to 15 | 8.3 to 10 | 3 |

TABLE 1-continued

| | Number of cycles | Percentage (%) | Value of Data |
|---|---|---|---|
| . | . | . | . |
| . | . | . | . |
| . | . | . | . |
| $T_8$ | 32 to 35 | 22 to 24 | 8 |
| $T_9$ | 36 to 39 | 25 to 27 | 9 |
| $T_A$ | 40 to 43 | 28 to 30 | A |
| $T_B$ | 44 to 47 | 31 to 33 | B |
| . | . | . | . |
| . | . | . | . |
| . | . | . | . |
| $T_Z$ | 140 to 143 | 97 to 100 | Z |

In this example, each symbol is assigned four cycles. For example, the symbol 0 (zero) is assigned zero, one, two, and three cycles and the symbol 1 (one) is assigned four, five, six, and seven cycles. The number of cycles assigned to a particular symbol depends on the acceptable error in coded and decoding the information. The more cycles that are assigned to a particular symbol, the less the error is in encoding and decoding it. Further, the less cycles that are assigned to a particular symbol, the more the error is in encoding and decoding it.

For example, in one method, the number zero is assigned to a number of cycles between 0 and 72 and the number one is assigned to a number of cycles between 73 and 144 so that the information corresponds to binary data (base 2). The accuracy of this binary coded scheme is more accurate than the scheme of Table 1. This is because it is generally more difficult and less accurate to determine if the number of cycles is between zero and three ('0') or four and seven ('1'), for example, then it is to determine if the number of cycles is between 0 and 72 ('0') 72 ('0') or 73 and 144 ('1'). However, an advantage of having a fewer number of cycles assigned to a particular symbol is that more different symbols can be represented, so that the data compression is increased. Further, many more different symbols can be coded in time $T_{Zero}$. For example, in the binary scheme, only two symbols can be coded in time $T_{Zero}$ (a '0' or a '1'), but in the scheme of Table 1, 36 different symbol can be coded in time $T_{Zero}$ (0 to 10 and A to Z). Hence, the transmission of information is faster.

It should be noted that there are several other ways to determine the symbol of the signal in time $T_{Zero}$. In the example above, the number of cycles of the sinusoid in time $T_{Zero}$ is determined. In another way, the percentage that the signal is sinusoidal in time $T_{Zero}$ can be determined. For example, signal 130 is sinusoidal for a time $T_2$ in time $T_{Zero}$. Since time $T_2$ is 10 cycles out of 144 total cycles, time $T_2$ is about 6.9% of time $T_{Zero}$. According to Table 1, signal 130 represents a '2' (two) since a signal that is sinusoidal between about 5.6 to 7.6 percent of $T_{Zero}$ is assigned the symbol '2'. Similarly, signal 131 is sinusoidal for a time $T_1$ in time $T_{Zero}$. Since time $T_1$ is 6 cycles out of 144 total cycles, time $T_2$ is about 4.2% of time $T_{Zero}$. According to Table 1, signal 130 represents a '1' (one) since a signal that is sinusoidal between about 2.8% to 4.9% of $T_{Zero}$ is assigned the symbol '1'. Further, signal 132 is sinusoidal for a time $T_5$ in time $T_{Zero}$. Since time $T_5$ is 20 cycles out of 144 total cycles, time $T_5$ is about 13.9% of time $T_{Zero}$. According to Table 1, signal 132 represents a '5' (five) since a signal that is sinusoidal between about 13.9% to 16% of $T_{Zero}$ is assigned the symbol '5'. In another way, the number of half cycles of the sinusoid or the number of peaks and/or valleys in the oscillating signal can be determined. In other examples, the amount of time that the signal is zero within time $T_{Zero}$ is determined (i.e. $T_{Zero}-T_2$) and compared to $T_{Zero}$ ($[T_{Zero}-T_2]/T_{Zero}$). This percentage is then used to determine the code in a manner similar to that described above.

FIG. 10G shows another way that the symbols can be coded. Here, time $T_2$ is determined by the occurrence of pulses 140 and 141. This can be done by using a timer or counter circuit. Once time $T_2$ is determined, it can be compared to time $T_{Zero}$ to determine the percentage of $T_2$ to $T_{Zero}$. As discussed above, time $T_2$ is 10 cycles out of 144 total cycles, so time $T_2$ is about 6.9% of time $T_{Zero}$ and signal 130 represents a '2' (two) according to Table 1.

It should be noted that the codes discussed herein involve digital data, which is represented by a bit. A bit can be a one ('1') and zero ('0'). The bits can be grouped together for convenience into groups of bits referred to as bytes and words, wherein a byte includes eight bits and a word includes thirty two bits. The digital data can be represented in different bases, such as as hexadecimal.

FIG. 10H shows signal $S_{20}$ as being a sinusoidal signal with an amplitude of $V_{20}$. FIG. 10I shows signal $S_3$ as being a sinusoidal signal with an amplitude of $V_3$. FIG. 10J shows signal $S_4$ which is signal $S_3$ after it has been amplified by amplifier circuit 58. Signal $S_4$ has an amplitude of $V_4$ which is greater than $V_3$. FIG. 10K shows signal $S_5$ which is signal $S_4$ after it has been converted to a square wave by sine-to-square wave circuit 62. Signal $S_5$ has an amplitude of $V_5$. FIG. 10L shows signal $S_6$ which is a square wave. Signal $S_6$ has an amplitude of $V_6$. FIG. 10M shows signal $S_7$ which is signal $S_6$ after it has been converted to a sine wave by square-to-sine wave circuit 60. FIG. 10N shows signal $S_8$ which corresponds to signal $S_7$ after it has been attenuated by attenuator circuit 56. Signal $S_7$ has an amplitude of $V_7$ and signal $S_8$ has an amplitude of $V_8$ where $V_7$ is greater than $V_8$. FIG. 10O shows signal $S_9$ which is signal $S_8$ after it has been passed between lines 83b and 81b by isolation circuit 68. Signal $S_{10}$ is a filtered version of signal $S_9$. Signal $S_9$ is filtered to provide $S_{10}$ to remove unwanted modes that may be present in signal $S_9$.

It should be noted that the signals of FIG. 6 described above in conjunction with FIGS. 10A-10O are the same or similar to the signals of FIG. 7, but they are not shown for simplicity. Further, it should be noted that the various signals of FIGS. 6 and 7 can have different amplitudes and frequencies. In one particular example, $S_{Power}$ has a peak-to-peak amplitude of about 120 V and oscillates at 60 Hz. The other signals oscillate at the carrier frequency, which in these examples is $f_{Carrier}$=120 kHz. In this example, signals $S_1$ and $S_{10}$ each have peak-to-peak amplitudes of about 4 V and signals $V_{20}$ and $V_{21}$ each have peak-to-peak amplitudes of about 5 mV ($V_{20}$=2.5 mV). Signals $S_3$ and $S_{12}$ have peak-to-peak amplitudes of about 100 mV ($V_3$=100 mV), although they typically have amplitudes in a range between 100 mV to 500 mV. Further, signals $S_4$ and $S_{13}$ each have peak-to-peak amplitudes of about 5 V ($V_4$=2.5 V) and signals $S_5$, $S_6$, and $S_{14}$, and $S_{15}$ each have amplitudes of 5 V ($V_5$=5 V, $V_6$=5 V). Signals $S_7$ and $S_{16}$ each have peak-to-peak amplitudes of 5 V ($V_7$=2.5 V) and signals $S_8$ and $S_{17}$ each have amplitudes of 200 mV ($V_8$=100 mV). Signals $S_9$, $S_{10}$, $S_{18}$, and $S_{19}$ each have peak-to-peak amplitudes of 4 V ($V_9$=2 V). It should be noted, however, that the amplitude and frequency values listed here are for illustrative purposes and they could have other values.

FIG. 11 is a block diagram of a method 150 of controlling and monitoring an electrical load using a power monitoring and control apparatus. It should be noted that the steps in method 150 can be performed in other ways, but only one way is shown here for illustrative purposes. Method 150 starts at a step 150 and then initializes the primary and secondary controllers at a step 154. In a step 156, it is determined whether a first message has been received from a terminal device by the primary controller from the terminal device. If the first message has been received, then the first message is processed and sent by the primary controller to the secondary controller in a step 158. In a step 160, it is determined whether the first message from the primary controller has been received by the secondary controller. If it has, then control is sent back to step 156. If it has not, then control is sent back to step 158.

If the first message from the terminal device has not been received by the primary controller in step 156, then it is determined if a second message has been received by the primary controller from the secondary controller in a step 162. If it has been received, then the second message is processed and sent to the terminal device in a step 164. In a step 166, it is determined whether the second message from the secondary controller has been received by the primary controller and sent to the terminal device. If it has, then control is sent back to step 156. If it has not, then control is sent back to step 164.

Figure 12D:
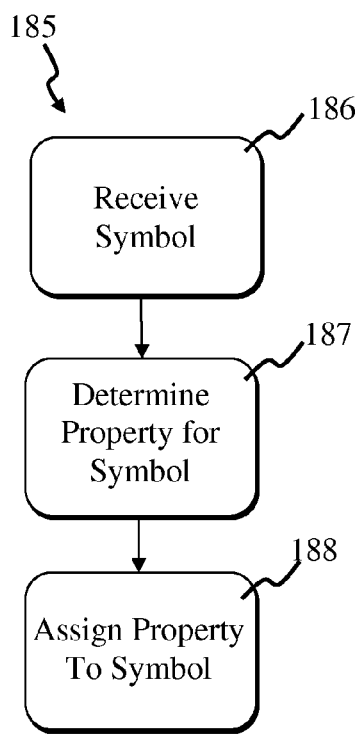
FIGS. 12D-12F are block diagrams of a method of decoding a symbol.

FIGS. 12A-12F are block diagrams of methods of coding symbols and decoding waveforms. In FIG. 12A, a method 170 of decoding waveforms includes a step 171 of receiving a waveform. A property of the waveform is determined in a step 172 and the waveform is assigned a symbol in response to the property in a step 173. The property of the waveform can be, for example, its period, frequency, etc. The property can also be the ratio of the time that the waveform oscillates to a predetermined time, such as $T_{Zero}$. The symbol assigned to the waveform can be an ASCI character, such as a letter or number, or another symbol which is desired to decode.

In one example, the property of the waveform has a one-to-one correspondence to the symbol it represents. For example, a waveform with zero oscillations within the predetermined time is assigned the symbol '0' (zero) and a waveform with one oscillation within the predetermined time is assigned the symbol '1' (one). In another example, waveforms with between zero and three oscillations within the predetermined time are assigned the symbol '0' (zero) and waveforms with between four and seven oscillations within the predetermined time are assigned the symbol '1' (one).

In FIG. 12B, a method 175 of decoding waveforms includes a step 176 of receiving a time varying waveform. The time varying waveform can be sinusoidal, square, triangular, etc. In a step 177, the number of cycles within a predetermined time in the time varying waveform is varying waveform is determined. In a step 178, a symbol is assigned to the time varying waveform in response to the number of cycles within the predetermined time. In some examples, the number of cycles can be full cycles based on the period of the time varying waveform and in other examples, the number of cycles can be based on half or quarter periods of the time varying waveform.

In FIG. 12C, a method 180 of decoding waveforms includes a step 181 of receiving a waveform. In a step 182, the time between pulses in the waveform is determined. In a step 183, a symbol is assigned to the waveform in response to the time between the pulses. In some examples, the time between pulses is compared to a predetermined time, such as time $T_{Zero}$.

In FIG. 12D, a method 185 of encoding symbols includes a step 186 of receiving a symbol. A property for the symbol is determined in a step 187 and the symbol is assigned a waveform in response to the property in a step 188. The property for the symbol can be, for example, the period, frequency, etc. of the waveform. The property can also be the ratio of the time that the waveform oscillates to a predetermined time, such as $T_{Zero}$. The symbol can be an ASCI character, such as a letter or number, or another symbol which is desired to encode.

Figure 12E:
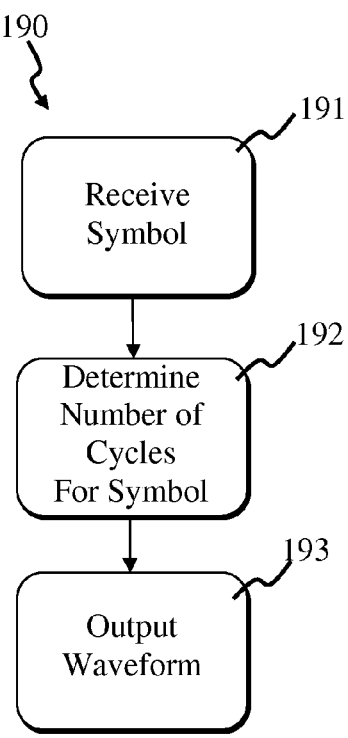

In FIG. 12E, a method 190 of encoding a symbol includes a step 191 of receiving a symbol. In a step 192, the number of cycles of a waveform for the symbol is determined. The number of cycles corresponds to that in the waveform within a predetermined time. In a step 193, the waveform corresponding to the symbol is outputted. In some examples, the number of cycles can be full cycles based on the period of the waveform and in other examples, the number of cycles can be based on half or quarter periods of the waveform.

Figure 12F:
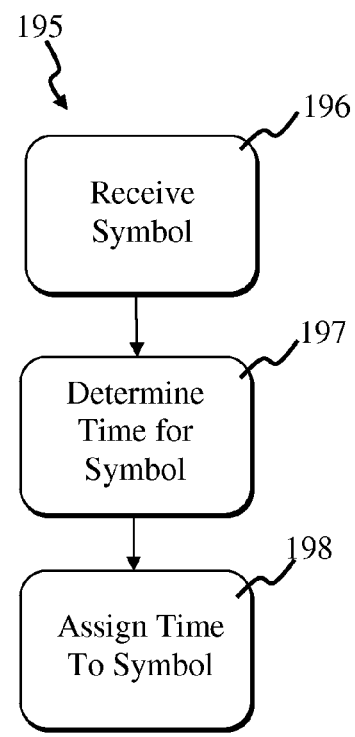

In FIG. 12F, a method 195 of encoding a symbol includes a step 196 of receiving a symbol. In a step 197, a time which corresponds to the symbol is determined. The time corresponds to the time between pulses in a waveform. In a step 198, the time between pulses is assigned to the symbol. The waveform can then be outputted with pulses spaced apart by the time determined in step 197.

Figure 13:
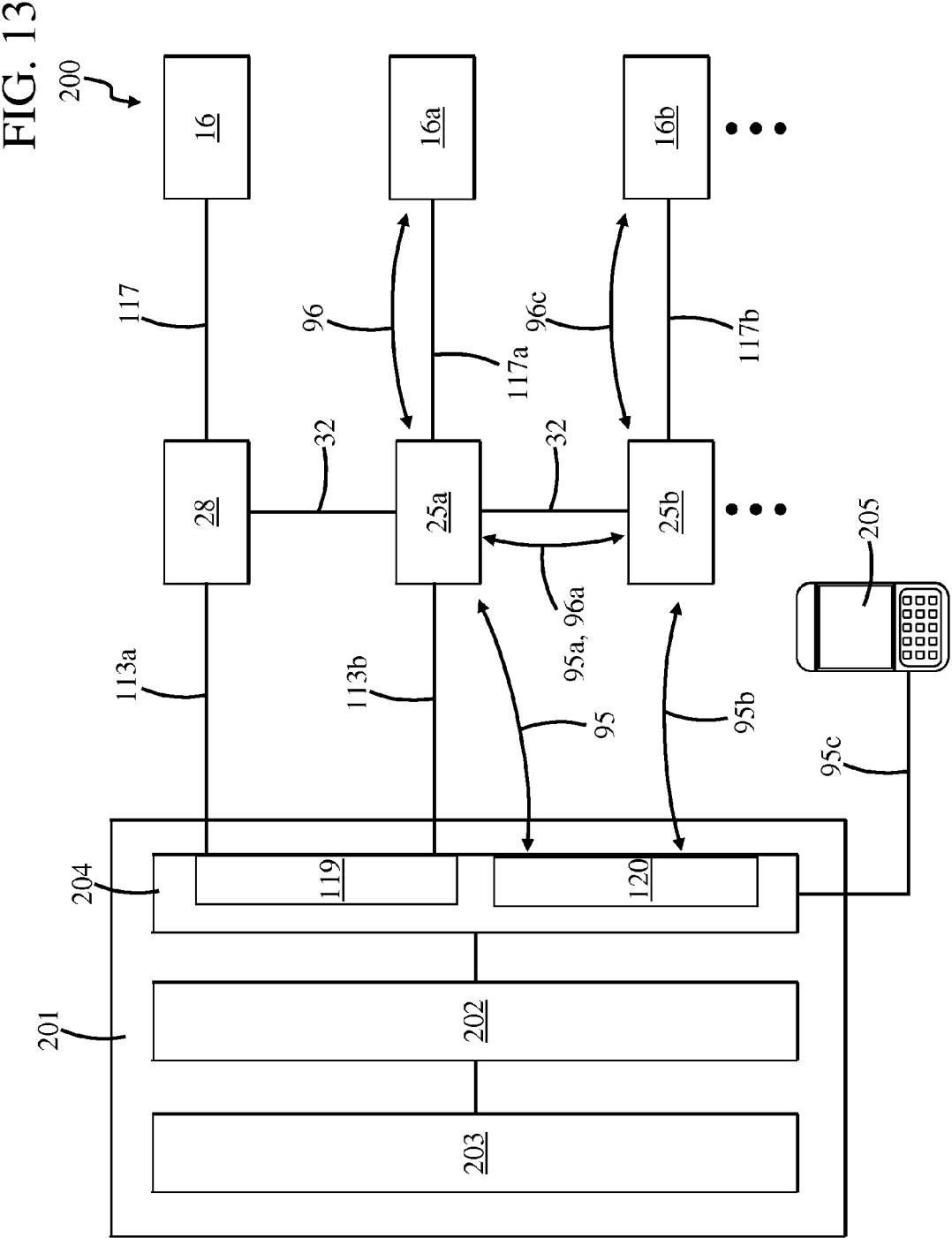
FIG. 13 is a block diagram of an energy management system.

FIG. 13 is a block diagram of a system 200. It should be noted that system 200 can include many of the components discussed in more detail above. Further, system 200 can operate in the same manner as the systems discussed in more detail above.

In this embodiment system 200 includes a management system 201, wherein management system 201 includes a memory system 203 operatively coupled to processor 202. Memory system 203 can be of many different types, such as computer memory, and processor 202 202 can be of many different types, such as a computer processor. In some embodiments, management system includes a terminal device, which is discussed in more detail above. The terminal device can be a laptop computer, desktop computer, Pocket PC, Personal Digital Assistant (PDA), among others.

It should be noted that, in general, management system 201 includes one or more terminal devices. For example, management system 201 can include a plurality of terminal devices in communication with each other so they operate as a network. The network can be of many different types, such as a Wide Area Network (WAN), a Local Area Network and the Internet. Hence, the terminal devices can be located proximate to each other or away from each other in different geographical locations.

In this embodiment, management system 201 includes a communication system 204 operatively coupled to the processor 202. Communication system 204 can be of many different types. In this embodiment, communication system 204 includes a data connector receptacle which allows it to flow wired signals. Further, in this embodiment, communication system 204 includes a wireless module 120 which allows it to flow wired signals. Wired and wireless signals are discussed in more detail above.

In this embodiment, system 200 includes electronic device 16 and electrical outlet 28, wherein electronic device 16 is in communication with management system 201 through electrical outlet 28. Electronic device 16 can be in communication with management system 201 through electrical outlet 28 in many different ways, such as those discussed in more detail above.

In this embodiment, electronic device 16 and electrical outlet 28 are in communication with each other through power cord 117, as discussed in more detail above with FIGS. 5B, 5H, 5I and 5J. Further, electrical outlet 28 is in communication with communication system 204 through data connector receptacle 119 and data cable 113a, as discussed in more detail above with FIGS. 5C and 5H.

In this embodiment, system 200 includes electronic device 16a and electrical outlet 25a, wherein electronic device 16a is in communication with management system 201 through electrical outlet 25*a*. Electronic device 16*a* can be in communication with management system 201 through electrical outlet 25*a* in many different ways, such as those discussed in more detail above.

In this embodiment, electronic device 16*a* and electrical outlet 25*a* are in communication with each other through power cord 117*a* and/or wireless link 96, as discussed in more detail above with FIGS. 5B, 5F and 5J. Further, electrical outlet 25*a* is in communication with communication system 204 through data connector receptacle 119 and data cable 113*b*, as discussed in more detail above with FIGS. 5D and 5I. Electrical outlet 25*a* is also in communication with communication system 204 through wireless module 120 and wireless link 95.

In this embodiment, system 200 includes an electronic device 16*b* and electrical outlet 25*b*, wherein electronic device 16*b* is in communication with management system 201 through electrical outlet 25*b*. Electronic device 16*b* can be in communication with management system 201 through electrical outlet 25*b* in many different ways, such as those discussed in more detail above.

In this embodiment, electronic device 16*b* and electrical outlet 25*b* are in communication with each other through a power chord 117*b* and/or wireless link 96*c*, as discussed in more detail above with power cord 117*a* and wireless link 96, respectively. Further, electrical outlet 25*b* is in communication with communication system 204 through wireless module 120 and a wireless link 95*b*, as discussed in more detail above with wireless link 95.

In this embodiment, electrical outlets 28, 25*a* and 25*b* are in communication with each other. Electrical outlets 28, 25*a* and 25*b* can be in communication with each other in many different ways, such as those discussed in more detail above.

In this embodiment, electrical outlets 28 and 25*a* are in communication with each other through communication channel 32, as discussed in more detail above with FIGS. 5H and 5I, which involves a wired communication channel. It should be noted, however, that the communication between electrical outlets 28 and 25*a* can be through a wireless communication channel, or a combination of a wired and wireless communication channel, as discussed in more detail above with FIG. 5G.

In this embodiment, electrical outlets 25*a* and 25*b* are in communication with each other through communication channel 32, as discussed in more detail above with FIG. 5J, which involves wired and wireless communication channels. It should be noted, however, that the communication between electrical outlets 28 and 25*a* can be through a wired communication channel, as discussed in more detail above with FIGS. 5H and 5I.

In operation, the electrical outlets of system 200 collect information from the corresponding electrical load and flow it to management system 201 in a manner described in more detail above. The information is received by communication system 204 and, in response to to the operation of processor 202, the information is stored with memory system 203. It should be noted that the electrical loads of system 200 can be of many different types, such as the ones discussed in more detail above.

Processor 202 processes the information of memory system 203 to determine one or more performance parameters. The performance parameters can be of many different types, such as those discussed in more detail above. For example, management system 201 can determine the amount of power consumed over a particular period of time by the electrical loads of system 200. This is desirable because sometimes there are two rates for electrical power, a low rate and a high rate. In some instances, the low rate is paid when the total power usage is below a predetermined threshold power value and the high rate is paid when the total power usage is above the predetermined threshold power value. Since it is desirable for the consumer to pay the lower rate, system 200 can be used to determine the total power usage so it can be compared to the predetermined threshold power value. In this way, the consumer will know how much power they can use before they go above the threshold power value and have to pay the higher rate.

It should be noted that the electrical loads of system 200 can be of many different types, such as those mentioned above. Examples include an appliance, computer, phone, water heater, air conditioner, water pump and smoke detector, among others. Examples of appliances include a refrigerator, washer, dryer, water heater, water pump, powered door, door sensor, powered window, window sensor, television and power storage device, among others. In general, the electrical load consumes electrical energy during operation.

The performance parameters determined by management system 201 can be stored with management system 201, such as in memory system 203. The performance parameters determined by management system 201 can also be provided to the user of the electronic devices of system 200 so they can determine how much the operation of the electronic devices costs. The information can be provided to the user of the electronic devices of system 200 in many different ways, such as through a wired link, a wireless link and combinations thereof. In some embodiments, the information is emailed to the user and, in some embodiments, a short message service (SMS is used so that the information is flowed to the user's phone as a text message. It is useful to flow the information to the user's mobile device for convenience.

FIG. 14 is a block diagram of a system 210, wherein management system 200 is replaced by mobile phone 205. It should be noted that system 210 can include many of the components discussed in more detail above. Further, system 210 can operate in the same manner as the systems discussed in more detail above.

In some embodiments, systems 200 and 210, or any of the other systems disclosed herein, include a software system which controls the operation of management system 201. The software system can be of many different types, such as those which operate on a computer. The software system can also be of the type that operates on mobile phone 205, such as those manufactured by APPLE, Inc. of Cupertino, Calif. and a mobile phone which operates with an Android operating system. In this embodiment, mobile phone 205 is in communication with communication system 204 through a wireless link 95*c*. It should be noted that mobile phone 205 can be replaced with another type of phone, such as a landline phone, if desired. Further, mobile phone 205 can be replaced with a terminal device, such as a laptop computer, desktop computer and Personal Digital Assistant (PDA).

The software system can allow the user to determine which electronic devices to monitor and control. Further, the software system can allow the user to determine how the information is processed. The software can allow the user to determine the type of performance parameter determined from the information discussed in more detail above. The software can allow the user to control the operation of the electronic devices in the manner described in more detail above. Hence, mobile phone 205 can control the operation of the electronic devices.

The information can be flowed using many different codes, such as those discussed in more detail above. It is desired to have a code which reduces the amount of information that is flowed and stored with memory system 203. Reducing the amount of information flowed is desirable to reduce the amount of power consumed by system 200, as well as to reduce the cost of memory system 203. One example of a code which can be used will be discussed in more detail presently. It should be noted that the code involves digital data, which is represented by a bit. A bit can be a one ('1') and zero ('0'). The bits can be grouped together for convenience into groups of bits referred to as bytes and words, wherein a byte includes eight bits and a word includes thirty two bits. The digital data can be represented in different bases, such as hexadecimal.

Table 2 includes one example of a code which can be used by system 200, or the other systems disclosed herein, to flow information from management system 201 to the electronic devices of system 200.

TABLE 2

| Byte Name | Byte | Data | Description |
|---|---|---|---|
| Packet Header | 1 | 255 | Header Byte 0xFF |
| Node ID Socket Address | 2 | 1 to 255 | Node ID = 1 Global command for all Nodes |
| Parameter ID | 3 | A to Z | Parameter ID (see table) |
| Data Byte 1 | 4 | 0 to 255 | Data Byte 1 |

TABLE 2-continued

| Byte Name | Byte | Data | Description |
|---|---|---|---|
| Data Byte 2 | 5 | 0 to 255 | Data Byte 2 |
| Packet Footer | 6 | 170 | Footer Byte 0xAA |

Examples 255, 17, A, 2, CRC, 170
255 = Start, TARAS Remote Node ID = 17, Parameter A = Switch load off, Data = 2, CRC, 170

Table 3 includes one example of a code which can be used by system 200, or the other systems disclosed herein, to flow information from the electronic devices of system 200 to management system 201.

TABLE 3

| Byte Name | Byte | Data | Description |
|---|---|---|---|
| Packet Header | 1 | '<' | Header Byte "<" (60) |
| Node ID Address | 2 | 1 to 255 | Node ID = 1 to 255 Nodes if less than 1 then error code |
| Parameter ID | 3 | A to Z | Parameter ID (see table) |
| Data Byte 1 | 4 | 0 to 255 | Data Byte 1 of parameter |
| Data Byte 2 | 5 | 0 to 255 | Data Byte 2 of parameter |
| Data Byte 3 | 6 | 0 to 255 | Data Byte 3 of parameter |
| Data Byte 4 | 7 | 0 to 255 | Data Byte 4 of parameter |
| Packet Footer | 8 | '>' | Footer Byte ">" (62) |

Table 4 includes one example of a parameter table which can be used by system 200, or the other systems disclosed herein, to code the information discussed above. It should be noted that LSB means least significant bit and MSB means most significant bit.

TABLE 4

| Parameter Name | ID | Data Byte 1 | Description |
|---|---|---|---|
| Switch Load On | A | 49 | Switch load on at the electrical wall outlet node ID |
| Switch Load Off | A | 50 | Switch load off at the electrical wall outlet node ID |
| Switch Load Off Smart | A | 51 | Switch load off at the outlet node ID when load <10 W |
| Set PIR Motion Sensor Timer | B | 01 to 127 | PIR timeout period in minutes - Relay OFF timer |
| Set PIR Motion Sensor Timer | B | 128 to 255 | PIR timeout period in minutes - Relay ON timer |
| Set Temperature High | C | 01 to 99 | Set point for room temperature high in C. deg. |
| Set Temperature Low | D | 01 to 99 | Set point for room temperature low in C. deg. |
| Set Date and Time | E | *See Below | Real time clock parameter |
| Set Kv voltage constant | F | 00 to 99 | Meter constant for voltage ratio = |
| Set Kv voltage constant | G | 00 to 99 | Meter constant for voltage ratio = |
| Set Ki current constant | H | 00 to 99 | Meter constant for current ratio = |
| Set Ki current constant | I | 00 to 99 | Meter constant for current ratio = |
| Set Node Address | J | 11 to 255 | Set Slave Node Socket Address ID |
| Spare | K | | |
| Spare | L | | |
| Send Node Power Factor | M | 48 | Returns Power factor (4 data bytes) |
| Send Node Mains Voltage/Freq | N | 48 | Returns Mains voltage and Frequency (4 data bytes) |
| Send Node Mains Current | O | 48 | Returns Mains current (4 data bytes) |
| Send Line Cycle Count LO & HI | P | 48 | Read value of ESP430 LINECYCLCNT (4 data bytes) |
| Send Node Active Energy | Q | 48 | Send real power consumed by the load (4 data bytes) |
| Send Node Reactive Energy | R | 48 | Send reactive power consumed by the load (4 data bytes) |
| Send Node Apparent Energy | S | 48 | Send apparent power consumed by the load (4 data bytes) |
| Send Node Room Temperature | T | 49 to 55 | **Returns node room temperature sensor reading |
| Send Node Room | U | 49 to 55 | ***Returns node room water sensor flow reading |

TABLE 4-continued

| | | | |
|---|---|---|---|
| Water usage Send Node Room Smoke Detector/Door/Window | V | 49 to 55 | ****Returns node room smoke detector/door/window alarm/open/closed |
| Send Energy used in KW/hr | W | 49 | Returns current energy consumption in KW/hr |
| Reset Energy used in KW/hr | W | 50 | Reset energy consumption Flash register for KW/hr |
| Send Total Energy in KW/hr | X | 48 | Returns total energy used since socket was installed |
| | Y | | |
| Node Reply Message - ACK | Z | 49 | Message at Node ID received correctly |
| Node Reply Message - NAK | Z | 50 | Message at Node ID received incorrectly - CRC error |

*Set Date and Time - MSB = 1 to 12 (YY, MM, DD, HH, MM, SS), LSB = Data (0 to 9).
Example set the day to $17^{th}$ (MSB = 5, LSB = 1) the data byte would be hex 0x51(not decimal 51)
next command data byte is (MSB = 6, LSB = 7) the data byte would be hex 0x67(not decimal 67)
Example packet for above - [255.Node Address, E, 81, 170] next packet sent is [255.Node Address, E, 103, 170]
**Other data returned with temperature. Example - "<, Node Address, T, Data1, Data2, Data3, Data4, >"
Data1 = Temp. in Centigrade 0 to 100, Data2 = Humidity in % 0 to 100, Data3 = Light Level in % 0 to 100
Data4 LSB =   00000001 = no motion on sensor 1, 00001001 = detected motion on sensor 1
              00000010 = no motion on sensor 2, 00001010 = detected motion on sensor 2
              00000011 = no motion on sensor 3, 00001011 = detected motion on sensor 3
              00000100 = no motion on sensor 4, 00001100 = detected motion on sensor 4
              00000101 = no motion on sensor 5, 00001101 = detected motion on sensor 5
              00000110 = no motion on sensor 6, 00001110 = detected motion on sensor 6
              00000111 = no motion on sensor 7, 00001111 = detected motion on sensor 7
Data4 MSB = Temperature/Motion Sensor Battery Charge Level 0 to 15
***Data returned with water flow reading. Example - "<, Node Address, U, Data1, Data2, Data3, Data4, >"
Data1 & Data2 = Water Flow in whole gallons used (max up to 65,535)
Data3 = Water Flow in 1/100 gallon used
Data4 LSB =   00000001 = water not flowing - sensor 1, 00001001 = water flowing - sensor 1
              00000010 = water not flowing - sensor 2, 00001010 = water flowing - sensor 2
              00000011 = water not flowing - sensor 3, 00001011 = water flowing - sensor 3
              00000100 = water not flowing - sensor 4, 00001100 = water flowing - sensor 4
              00000101 = water not flowing - sensor 5, 00001101 = water flowing - sensor 5
              00000110 = water not flowing - sensor 6, 00001110 = water flowing - sensor 6
              00000111 = water not flowing - sensor 7, 00001111 = water flowing - sensor 7
Data4 MSB = Water Sensor Battery Charge Level 0 to 15
****Data returned from smoke detector/door/window sensor. "<, Node Address, V, Data1, Data2, Data3, Data4, >"
Data1 LSB =   00000001 = door closed - sensor 1, 00001001 = door open - sensor 1
              00000010 = door closed - sensor 2, 00001010 = door open - sensor 2
              00000011 = door closed - sensor 3, 00001011 = door open - sensor 3
              00000100 = door closed - sensor 4, 00001100 = door open - sensor 4
              00000101 = door closed - sensor 5, 00001101 = door open - sensor 5
              00000110 = door closed - sensor 6, 00001110 = door open - sensor 6
              00000111 = door closed - sensor 7, 00001111 = door open - sensor 7
Data1 MSB = Door Sensor Battery Charge Level 0 to 15
Data2 LSB =   00000001 = window closed - sensor 1, 00001001 = window open - sensor 1
              00000010 = window closed - sensor 2, 00001010 = window open - sensor 2
              00000011 = window closed - sensor 3, 00001011 = window open - sensor 3
              00000100 = window closed - sensor 4, 00001100 = window open - sensor 4
              00000101 = window closed - sensor 5, 00001101 = window open - sensor 5
              00000110 = window closed - sensor 6, 00001110 = window open - sensor 6
              00000111 = window closed - sensor 7, 00001111 = window open - sensor 7
Data2 MSB = Window Sensor Battery Charge Level 0 to 15
Data3 LSB =   00000001 = smoke detector off - sensor 1, 00001001 = smoke detector alarm on - sensor 1
              00000010 = smoke detector off - sensor 2, 00001010 = smoke detector alarm on - sensor 2
              00000011 = smoke detector off - sensor 3, 00001011 = smoke detector alarm on - sensor 3
              00000100 = smoke detector off - sensor 4, 00001100 = smoke detector alarm on - sensor 4
              00000101 = smoke detector off - sensor 5, 00001101 = smoke detector alarm on - sensor 5
              00000110 = smoke detector off - sensor 6, 00001110 = smoke detector alarm on - sensor 6
              00000111 = smoke detector off - sensor 7, 00001111 = smoke detector alarm on - sensor 7
Data3 MSB = Smoke detector Sensor Battery Charge Level 0 to 15
Data4 LSB =   00000001 = CO detector off - sensor 1, 00001001 = CO detector alarm on - sensor 1
              00000010 = CO detector off - sensor 2, 00001010 = CO detector alarm on - sensor 2
              00000011 = CO detector off - sensor 3, 00001011 = CO detector alarm on - sensor 3

TABLE 4-continued

```
00000100 = CO detector off - sensor 4, 00001100 = CO detector alarm on - sensor 4
00000101 = CO detector off - sensor 5, 00001101 = CO detector alarm on - sensor 5
00000110 = CO detector off - sensor 6, 00001110 = CO detector alarm on - sensor 6
00000111 = CO detector off - sensor 7, 00001111 = CO detector alarm on - sensor 7
Data4 MSB = CO detector Sensor Battery Charge Level 0 to 15
```

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A system. comprising:
an electrical load;
a first electrical outlet which includes a first controller which determines information regarding the electrical load; and
a management system which receives the information from the first controller and determines a performance parameter of the electrical load;
wherein the management system adjusts the operation of the electrical load in response to the performance parameter.

2. The system of claim 1, Wherein the information determined corresponds to a power factor of electrical load.

3. The system of claim 2. wherein the information determined corresponds to a voltage of the electrical load.

4. The system of claim 1. wherein the information determined corresponds to a power usage of the electrical load.

5. The system of claim 1, wherein the first electrical outlet provides power to the electrical load.

6. The system of claim 1, wherein the management system includes a terminal device which determines the performance parameter.

7. The system of claim 1, further including a second electrical outlet Which includes a second controller in communication with the management system.

8. The system of claim 7, wherein the second controller is in communication with the first controller through a second wireless communication link.

9. A system, comprising:
a first controller carried by a first electrical outlet;
a management system in communication with the first controller through a first communication link;
a second controller carried by a second electrical outlet:
an electrical load which operates in response to receiving power from the second electrical outlet;
wherein the management system determines a performance parameter of the electrical load in response to receiving information corresponding to the operation of the electrical load from the first controller.

10. The system of claim 9, wherein the information flows through as second communication link established between the first and second controllers.

11. The system of claim 10, wherein the First communication link is a wireless communication link.

12. The system of claim 9, wherein the management system monitors the operation of the electrical load.

13. The system of claim 9, wherein the performance parameter corresponds to a power usage of the electrical load.

14. The system of claim 9, wherein the operation of the electrical load is adjustable in response to a coded control signal provided by the management system.

15. A system, comprising:
an electrical load;
a first electrical outlet which includes a first controller which determines operating information regarding the electrical load; and
a mobile phone which receives the operating information from the first controller and determines a performance parameter of the electrical load;
wherein the mobile phone adjusts the operation of the electrical load in response to the performance parameter.

16. The system of claim 15. wherein the mobile phone is in communication with the first controller through a first wireless communication link.

17. The system of claim 16, wherein the first controller includes a wireless module which establishes the first wireless communication link.

18. The system of claim 15, wherein the electrical load operates in response to receiving power from the first electrical outlet.

19. The system of claim 15, wherein the electrical load operates in response to receiving power from a second electrical outlet.

20. The system of claim 19, wherein the second electrical outlet carries a second controller, which is in communication with the mobile phone.

* * * * *